United States Patent [19]

Shiraishi et al.

[11] Patent Number: 4,859,034
[45] Date of Patent: * Aug. 22, 1989

[54] LIQUID CRYSTAL OPTICAL PRINTING APPARATUS

[75] Inventors: Yoshiaki Shiraishi, Shiojiri; Kenji Aoki, Suwa, both of Japan

[73] Assignee: Seiko Epson Corporation, Tokyo, Japan

[*] Notice: The portion of the term of this patent subsequent to May 20, 2003 has been disclaimed.

[21] Appl. No.: 861,688

[22] Filed: May 9, 1986

Related U.S. Application Data

[63] Continuation-in-part of Ser. No. 452,370, Dec. 23, 1982, Pat. No. 4,589,732.

[30] Foreign Application Priority Data

Dec. 28, 1981 [JP] Japan ................................. 56-213263

[51] Int. Cl.⁴ .................. G02F 1/13; G03B 27/00; G01D 9/42
[52] U.S. Cl. .................. 350/331 R; 350/346; 350/96.27; 355/1; 358/296; 346/108
[58] Field of Search ............. 350/96.25, 96.27, 331 R, 350/96.31, 346; 355/1, 67; 346/107 R, 108, 160 R; 358/296; 362/311

[56] References Cited

U.S. PATENT DOCUMENTS

| | | | |
|---|---|---|---|
| 3,982,829 | 9/1976 | Hirth | 355/1 |
| 4,154,500 | 5/1979 | Funato et al. | 350/96.25 |
| 4,264,130 | 4/1981 | Ogura | 350/96.31 X |
| 4,297,022 | 10/1981 | Lester | 350/331 R X |
| 4,331,380 | 5/1982 | Rees et al. | 350/96.25 |
| 4,349,248 | 9/1982 | Rees | 355/1 X |
| 4,373,780 | 2/1983 | Lama | 355/1 X |
| 4,386,836 | 6/1983 | Aoki et al. | 350/346 X |
| 4,435,064 | 3/1984 | Tsukada et al. | 346/107 R |
| 4,480,257 | 10/1984 | Hill | 346/107 R |
| 4,589,732 | 5/1986 | Shiraishi et al. | 350/331 R |
| 4,727,380 | 2/1988 | Miura et al. | 346/108 |

FOREIGN PATENT DOCUMENTS

| | | | |
|---|---|---|---|
| 1288902 | 9/1966 | Fed. Rep. of Germany | 355/67 |
| 0136825 | 10/1979 | Japan | 355/67 |
| 0014127 | 1/1983 | Japan | 355/67 |

*Primary Examiner*—Stanley D. Miller
*Assistant Examiner*—Huy Kim Mai
*Attorney, Agent, or Firm*—Blum Kaplan

[57] ABSTRACT

The optical printing apparatus comprises a fluorescent lamp light source and a means for concentrating light from the light source onto a liquid crystal panel. The liquid crystal panel includes a plurality of light valves disposed in rows. A driver is disposed on the outside of the shield plate for selectively opening and closing the light valves. Rows of self-focusing fiber lenses receive light from the light valves and direct the light onto a photosensitive drum for use in printing.

15 Claims, 15 Drawing Sheets

LIQUID CRYSTAL OPTICAL PRINTING APPARATUS

BACKGROUND OF THE INVENTION

This is a continuation - in part - of U.S. patent application Ser. No. 452,370 filed Dec. 23, 1982 now U.S. Pat. No. 4,589,732 issued 5/20/86.

This invention relates generally to an optical printing apparatus of the type where an image for printing is focused on an photo-sensitive surface and more particularly to an optical printing apparatus having a liquid crystal display using a nematic type liquid crystal material having dielectric anisotropy which is subject to inversion dependent on frequency so as to provide light valves. Light from the valves is directed to the photosensitive surface by means of self-focusing lens constructed with light-transmitting fibers. Heretofore, a laser printer has been used as an optical printing or copying apparatus for producing printed picture images of high quality. However, a laser printer has disadvantages in that it is powered by high voltage, utilizes dangerous laser beams, and is expensive to construct. Various apparatuses have been proposed to replace the laser printer, for example, an apparatus using light-emitting diodes and an apparatus with liquid crystals serving as an optical shutter, as described in Japanese Laid-open patent publication No. 55-6604 and U.S. Pat. No. 4,297,022. However, these concepts have not matured into marketable products and are impractical as the printing speed of the apparatus is too low for commercial application.

What is needed is an optical printing apparatus which provides high quality printing at high speed without the use of laser beams, and is inexpensive in construction relative to the performance levels achieved.

SUMMARY OF THE INVENTION

Generally speaking, in accordance with the invention, an optical printing apparatus which operates at high speed with good quality is provided. The optical printing apparatus comprises a light source in the form of a fluorescent lamp, a shield plate for blocking substantially all of the light emitted from the light source, a liquid crystal panel subject to irradiation with the light emitted from the light source and passing through a slit in the shield plate. The liquid crystal panel includes a plurality of light valves, a driver disposed on the outside of the shield plate for selectively opening and closing the light valves, and fibers disposed below the liquid crystal panel and functionally equivalent to a lens for self-focusing incident light which has passed through the light valves. The focused light falls on a photosensitive drum and printing is completed in the conventional manner. The light source, slit, liquid crystal panel and fibers are arranged in a line. The temperature and brightness of the light source are precisely controlled with feedback circuits and the liquid crystal panel is also temperature controlled.

The invention includes a nematic-type liquid crystal display unit with dielectric anisotropy which can be inverted dependent on frequency. The present optical printing apparatus has an improved cost vs. performance ratio through elimination of various problems associated with liquid crystals, molecular orientation, driving process, light source, assembly and the like, which heretofore would obstruct reduction to practice of an optical printing apparatus using liquid crystals. It is a feature of the invention that the self-focusing fiber lenses are constructed in an array of two rows, with the individual lenses arranged in a contacting, staggered relationship which simplifies construction and provides excellent light transmission. The diameters of the lenses are such that the respective upper and lower edges of the light window rows are positioned just within lines interconnecting the optical centers of the respective upper and lower rows lenses. Light transmission is thus maximized while substantial uniformity of light transmission to the photosensitive surface is provided.

Still another feature of the invention is the provision of optical means for substantially uniformly concentrating light from the light source on the array of self-focusing fiber lenses. In one embodiment the optical means is a rod lens. In another embodiment, the optical means consists of an elongated light guide plate which is rectangular in cross-section.

Accordingly, it is an object of this invention to provide an improved optical printing apparatus which uses a liquid crystal panel having a rapid response to provide light valves.

A further object of this invention is to provide an improved optical printing apparatus which focuses light on a photosensitive drum without the use of large or heavy lenses.

Still another object of this invention is to provide an improved optical printing apparatus which operates without the use of high voltage or laser beams.

Yet another object of this invention is to provide an improved optical printing apparatus which operates with a fluorescent light source and uses a self-focusing fiber lens system.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
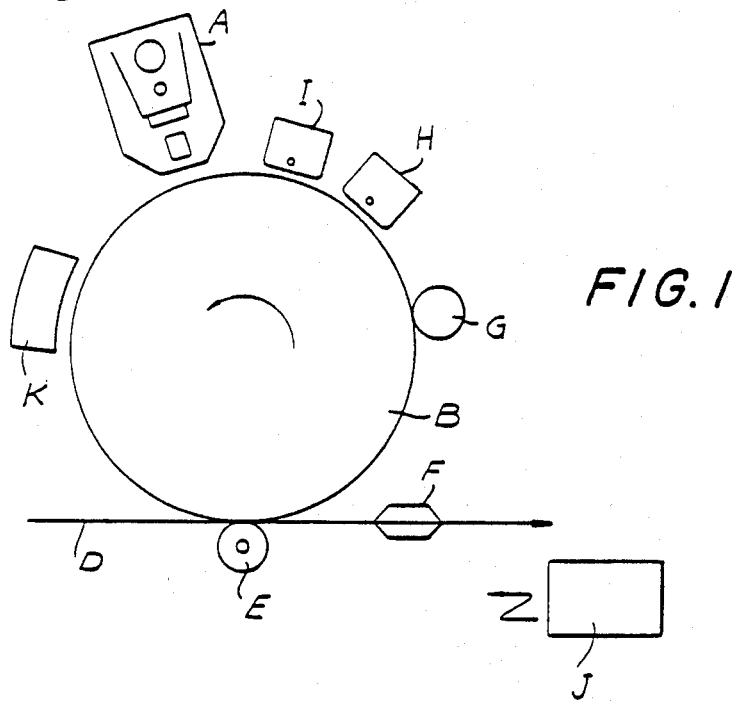
FIG. 1 is a functional block diagram of a printing system including a printing apparatus in accordance with the invention.

With reference to the drawings, FIG. 1 is a schematic diagram of a printing system in which a printing Apparatus A of the present invention is incorporated.

The printing system includes a photo sensitive drum D. An printing apparatus A of the invention, and a transfer corona discharge unit I which will operate in synchronism at a printing speed under the control of a driver circuit J.

Signals indicative of letters, numerals, patterns and the like to be printed are supplied from an external source to the printing apparatus A in which they are converted into corresponding optical signals that are delivered to the photosensitive drum B rotating in synchronism with the printing speed. Electric charges on the photosensitive drum B at portions thereof where the optical signals are applied are eliminated to thereby form an electrostatic latent image on the photosensitive drum B according to the write signals supplied from the printing apparatus A.

The electrostatic latent image on the photosensitive drum B is developed with toner by a developing unit K of the magnetic roller type, for example.

The developed toner image is then transferred by a photosensitive drum B onto a sheet D of recording paper traveling in synchronism with the photosensitive drum B. The toner image is fixed to the sheet D by a fixing unit F with light, heat and pressure applied thereby.

The area on the photosensitive drum B from which the toner image has not been transferred is brought toward a blade G by which any residual toner is removed from such area. Any residual image on the photosensitive drum B is then removed by a charge remover H comprising an AC corona discharge unit or lamp. The photosensitive drum B is charged again by the corona discharge unit I, and then supplied with optical write signals from the printing apparatus A so that another latent image will be formed thereon.

The foregoing processes are repeated in succession to produce prints or copies.

PRINTING APPARATUS A

Figure 2A:
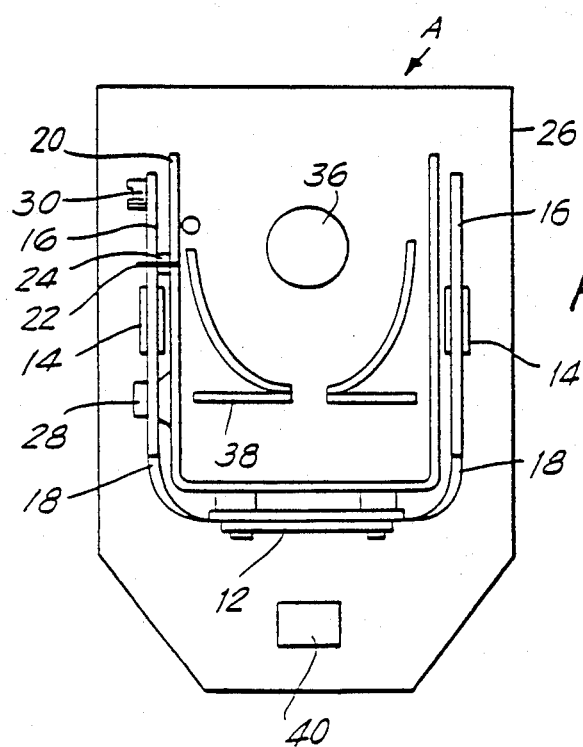
FIG. 2(a) is a simplified end view of the printing apparatus in accordance with the invention.
Figure 2B:
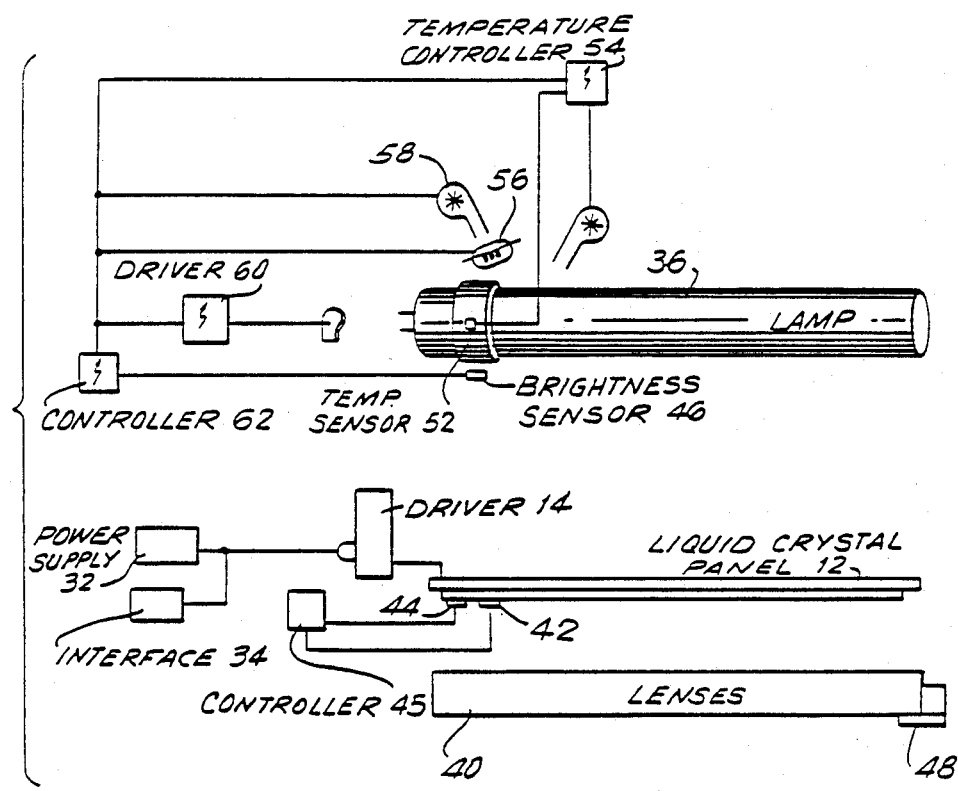
FIGS. 2(b) are schematic representations of control systems in the printing apparatus in accordance with the invention.
Figure 2C:
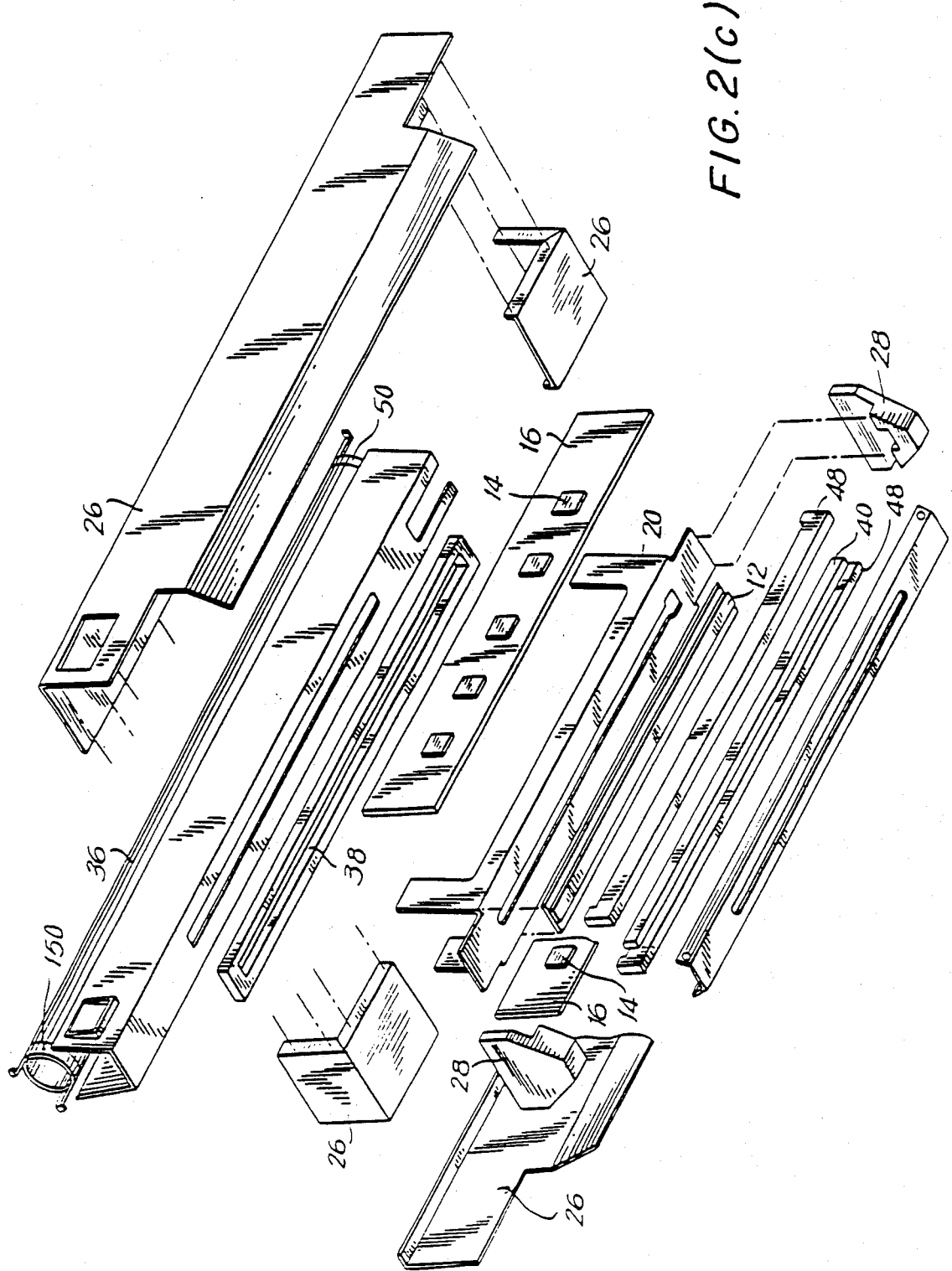
FIG. 2(c) is a perspective view of the mechanical construction of the printing apparatus in accordance with the invention.

FIGS. 2a-c are schematically illustrative of the printing apparatus A according to the present invention. FIG. 2(a) is a cross-sectional view of the printing apparatus; FIG. 2(b) is a diagram of the printing apparatus including a control system; and FIG. 2(c) is an exploded perspective view of the printing apparatus.

The printing apparatus comprises a liquid crystal panel 12 filled with a nematic-type liquid crystal material having its dielectric anistropy rendered negative by high frequency drive signals and rendered positive by low frequency drive signals. The liquid crystal panel 12 includes upper and lower substrates between which the liquid crystal material is sandwiched, the upper and lower substrates having their surfaces horizontally oriented to cause liquid crystal molecules to extend parallel to the substrates. The liquid crystal molecules are twisted between the substrates. Polarizers are arranged with their polarization axes aligned to block light transmission vertically across the liquid crystal material. The liquid crystal panel 12 is driven selectively by drive signals having high and low frequencies to open and close light valves thereof at a high speed.

Liquid crystal drivers 14 are mounted on substrates 16 for driving the liquid crystal panel 12 at two frequencies. The liquid crystal panel 12 and the substrates 16 are interconnected by connector substrates 18 over which liquid crystal drive signals from the drivers 14 are delivered to the liquid crystal panel 12 to drive the latter. The substrates 16 are fixed to a chassis 20 by a substrate fixture 22 such as a screw, with an insulator 24 such as an insulating plate, an adhesive or a double-sided adhesive tape interposed therebetween.

The printing apparatus also includes a frame 26 serving as an outer housing to unitize the components of the printing apparatus.

The substrates 16 on which the liquid crystal drivers 14 are mounted on the liquid crystal panel 12, drivable by the liquid crystal drivers 14, jointly constitute a module which is attached to the frame 26 by an attachment 28. A connector 30 is mounted on the frame 26 by the attachment 28 and is connected to an external power supply 32 for driving the liquid crystal drivers 14 and an interface 34 of an external signal source.

A light source 36 such as tungsten lamp, a halogen lamp, a xenon lamp, or a fluorescent lamp emits light which travels through a light outlet defined in a light shield 38 and irradiates the liquid crystal panel 12.

The light valves of the liquid crystal panel 12 are arranged in a single row or a plurality of rows and actuatable to pass only the light which is required to effect printing. The light which has passed through the light valves of the liquid crystal panel 12 is focused by a SELFOC lens array 40 on the surface of the photosensitive drum B (FIG. 1).

A panel heater 42 is attached to the liquid crystal panel 12 to raise or lower the temperature of the latter. A sensor 44 is also attached to the liquid crystal panel 12 and connected to a heater controller 46 to transmit a signal from the sensor 44 to the heater control 46, thereby constituting a feedback system for controlling the heater 42 with the controller 46.

The SELFOC lens array 40 is mounted on the frame 26 by an attachment 48 such as a screw, a double-sided adhesive tape, or an adhesive.

The lamp 36 is secured to the frame 26 by an attachment 50 such as a double-sided adhesive tape or an adhesive. The lamp 36 should preferably be a fluorescent lamp. To the lamp 36, there is attached a temperature sensor 52 connected to a temperature controller 54 which is coupled to a lamp heater 56 and a motor fan 58. The motor fan 58 serves to supply air as heated by the lamp heater 56 into the frame 26 to heat the lamp 36. The temperature sensor 52 attached to the lamp 36 serves to detect the temperature of the lamp 36 as heated by the lamp heater 56 and transmits a temperature-indicative signal to the temperature control 54. The temperature controller 54 controls the motor fan 58 and the lamp heater 56 and a lamp drive system 60 to maintain constant the temperature of the lamp 36 at its tube wall. The foregoing components associated with the lamp 36 thus jointly constitute a feedback system for keeping the lamp tube wall at a constant temperature.

The brightness sensor 46 is disposed in the frame 26 in an area irradiated with the light emitted from the lamp 36, and is connected to a brightness sensor controller 62 to provide a feedback system for controlling the intensity of the light radiated by the lamp 36 so that the light falling on the photosensitive drum will have a constant intensity per unit area at all times.

LIQUID CRYSTAL PANEL CONSTRUCTION

Figure 3A:
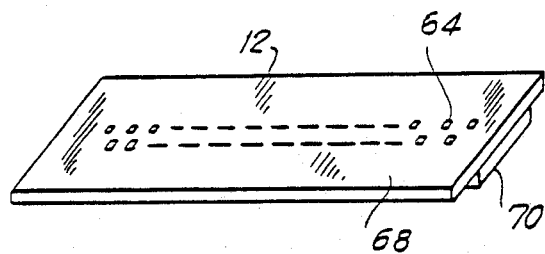
FIGS. 3(a-c) show perspective, plan and sectional views of the liquid crystal panel used in the printing apparatus in accordance with the invention.
Figure 3B:
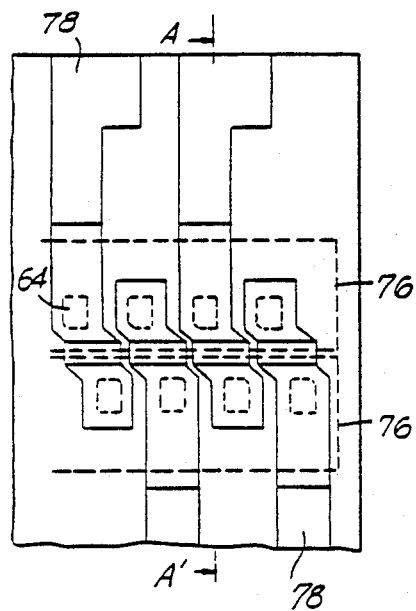
Figure 3C:
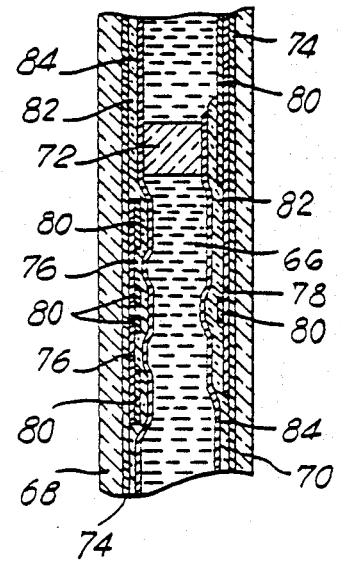

FIG. 3 shows the liquid crystal panel 12 in the printing apparatus according to the present invention. FIG. 3(a) is a perspective view of the overall liquid crystal panel 12; FIG. 3(b) is an enlarged fragmentary plan view of a light valve 64 of the liquid crystal panel 12; and FIG. 3(c) is a cross-sectional view taken along line A - A' of FIG. 3(b).

A liquid crystal material 66 is sandwiched between upper and lower substrates 68, 70 and sealed by a sealing agent 72. The liquid crystal layer has a thickness of from 3 to 7 microns which is maintained by the sealing agent 72 or glass fibers or glass particles of a constant thickness or diameter placed in the liquid crystal material 66 so that there is no localized variation in the thickness of the liquid crystal layer throughout the panel 12. The upper and lower substrates 68, 70 are made of transparent glass or plastic material.

Each of the upper and lower substrates 68, 70 has on its surface facing the liquid crystal material 66 a layer 74 of $SiO_2$ deposited by sputtering, vacuum evaporation, dipping or the like. The layer 74 serves to prevent alkali ions such as $Na^+$ from outside of the liquid crystal panel 12 or the substrates 68, 70 from entering or contacting the liquid crystal material 66 and prevents moisture from being introduced into the liquid crystal material. The thickness of the $SiO_2$ layer 74 ranges from about 400 to 2,000 angstrom. If the layer 74 were thinner than 400 angstrom, then it would be ineffective in preventing alkali ions or moisture from entering the liquid crystal layer. Conversely, if the layer 74 were thicker than 2,000 angstrom, the layer 74 itself would be liable to crack and would be fabricated only with more cost through an increased number of steps.

Transparent electrode patterns 76, 78 of $In_2O_3$ or $SnO_2$ are deposited on the $SiO_2$ layer by chemical etching or plasma etching. The transparent electrodes 76, 78 as they are made of $In_2O_3$ have a much lower electrical resistance than that of electrodes which are made of $SnO_2$, provided they are equal in thickness. Since the liquid crystal material 66 is driven by high-frequency signals as well as low-frequency signals for high response speeds, the time constant determined by the capacitance of the liquid crystal material 66 and the resistance of the driver 14 to the liquid crystal material 66 is required to be as small as possible, and the transparent electrodes 76, 78 should be made in $In_2O_3$ for its smaller resistance. The resistance from one of the terminals of the driver 14 up to a corresponding light valve 64 of the liquid crystal panel 12 is held within a range below a few hundred ohms. In FIG. 3(b), the signal electrode 78 formed on the lower substrates 70 is indicated by the solid lines, while the scanning electrode 76 formed on the upper substrate 68 is indicated by the broken lines.

On the scanning transparent electrode 76 and the signal transparent electrode 78 on the upper and lower substrates 68, 70, there are formed metal layers 80 of Au, Ag, Cu, Ni or the like at selected localized areas by sputtering, vacuum evaporation, plating or other processes, the metal layers of Ni being least expensive. Where the layers of Ni are deposited by plating, those areas which should not be plated with Ni are masked in advance by printed screen or coated photoresist, and then layers of Ni are deposited by a known electroless plating process which is usually used to prepare plastic articles for electroplating. In such an electroless plating process, Ni layers are selectively formed in those patterns on the transparent electrodes 76, 78 which are not masked. The metal layers 80 should be free from pinholes and of such a thickness which prevents light transmission therethrough.

FIG. 3(b) shows a pattern of the liquid crystal panel 12 as the latter is driven at half of its duty cycle. The signal electrode 78 formed on the upper substrate 68 has upper and lower portions serving as terminals on both sides of the liquid crystal panel 12. The upper terminal patterns of the signal electrode 78 and the lower terminal patterns of the signal electrode 78 are alternately disposed. The metal layer 80 is formed on each of signal electrode patterns 78 and extends from the terminal end to a position near the light valve 64, and the portion of the signal electrode pattern 78 where the scanning electrode 76 extends is transparent. The scanning electrode 76 deposited on the layer 74 is covered with the metal layers 80 except for the light valves 64. The lower substrate 70 has its terminals projecting out of the liquid crystal panel 12, and the upper substrate 68 has its scanning electrodes 76 projecting out of the liquid crystal panel 12. The metal layers 80 on the scanning electrodes 76 are soldered to lead wires which are connected to the drivers 14.

A layer 82 of $SiO_2$ is deposited on the metal layers 80 by sputtering, vacuum evaporation of the like as with the $SiO_2$ layers 74 formed on the upper and lower substrates 68, 70.

A layer of orienting agent 84 such as of polyimide, polyamide, or silane is deposited on each $SiO_2$ layer 82 such as by dipping or spraying, and then horizontally oriented by rubbing.

The liquid crystal panel constructed as shown in FIGS. 3(a) through 3(c) have the following advantages:

First, the liquid crystal panel 12 can be driven at ½ duty cycle so that the drivers 14 (FIG. 2) may be half as many as those required for static driving of the liquid crystal panel.

Second, the metal layers 80 of Ni, for example, are formed at the terminals of the signal electrodes 78 and the scanning electrodes 76, and can be soldered to the substrates 16 on which the drivers 14 are supported through the flexible substrates 18. This connecting arrangement reduces resistance and assures high connection reliability.

Third, with the metal layers 80 deposited on the transparent electrodes 76, 78 the electrical resistance from the drivers 14 (FIG. 2) to the liquid crystal material 66 can be reduced and thus the time constant can be lowered. The lowered time constant is particularly important for the printing apparatus A of the invention in which the liquid crystal panel is driven at a high frequency for high-speed response.

A fourth advantage is that the metal layers 80 are formed on the scanning electrodes 76 except for the light valves 64 of the liquid crystal panel 12, and no metal layer 80 is formed at the light valves 64 on the opposite signal electrodes 78, leaving the light valves transparent. This will facilitate positioning of the optical system.

According to a fifth advantage, light transmission is blocked by the metal layers 80 to prevent light from passing through portions except the light valves 64. Therefore, the signal-to-noise ratio for a latent image on the photosensitive drum B (FIG. 2) is improved for a sharper printed image.

A sixth benefit is that with the metal layers 80 used to prevent light passage, the width of the scanning electrodes 76 is larger than the diameter of each light valve 64, and hence the resistance of the lines composed of the scanning electrodes 76 is reduced, an arrangement which is favorable for high-speed response of the liquid crystal material 66.

LIQUID CRYSTAL MATERIAL

The liquid crystal material filled in the liquid crystal panel 12 shown in FIG. 3 is a mixture of a nematic type which is composed of:

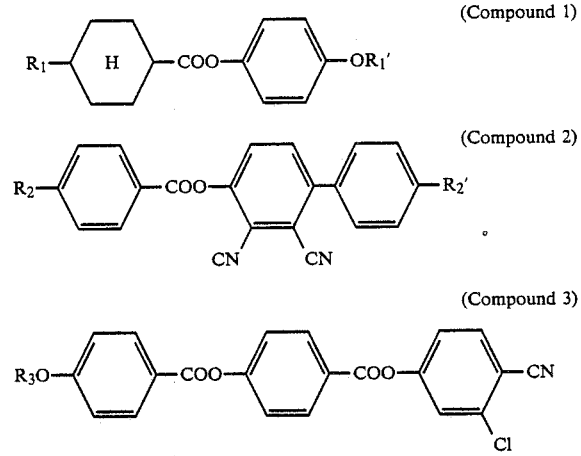

(Compound 1)

(Compound 2)

(Compound 3)

where $R_1 - R_2, R'_1 - R'_3$ are one of the following groups:

| alkyl group | $C_nH_{2n+1}-$ |
|---|---|
| alkoxy group | $C_nH_{2n+1}O-$ |
| cyanogen group | $-CN$ | with n being in the range of from 1 through 20.

Compound 1 is used for reducing the viscosity of the liquid crystal material. Compound 1 is advantageous in that it is of reduced viscosity and can provide a low relaxation frequency. For example, Compound 1 has a drive frequency which is of a figure one digit smaller than that for biphenyl liquid crystals, and can be driven in a wide range of temperatures. Compound 2 is added to increase the absolute value of the dielectric anisotropy of liquid crystal molecules at high frequencies. Compound 3 is included to increase the absolute value of the dielectric anisotropy of liquid crystal molecules at high frequencies.

The following table shows an example of the liquid crystal material which can be used in the printing apparatus according to the present invention.

TABLE

| Compound | Mixture ratio (wt %) | |
|---|---|---|
| $C_3H_7-\langle H \rangle-COO-\langle\rangle-OC_2H_6$ | 20 | 60 |
| $C_5H_{11}-\langle H \rangle-COO-\langle\rangle-O-CH_3$ | 20 | |
| $C_4H_9-\langle H \rangle-COO-\langle\rangle-OC_2H_5$ | 10 | |
| $C_9H_{19}-\langle H \rangle-COO-\langle\rangle-OC_7H_{15}$ | 10 | |
| $C_2H_5-\langle\rangle-COO-\langle\rangle(CN)(CN)-COO-\langle\rangle-C_6H_{13}$ | 7 | 20 |
| $C_5H_{11}-\langle\rangle-COO-\langle\rangle(CN)(CN)-COO-\langle\rangle-C_6H_{13}$ | 7 | |
| $C_3H_7-\langle\rangle-COO-\langle\rangle(CN)(CN)-COO-\langle\rangle-C_2H_5$ | 6 | |
| $C_5H_{11}-\langle\rangle-COO-\langle\rangle-COO-\langle\rangle(Cl)-CN$ | 10 | 20 |
| $C_8H_{17}-\langle\rangle-COO-\langle\rangle-COO-\langle\rangle(Cl)-CN$ | 5 | |
| $C_2H_5-\langle\rangle-COO-\langle\rangle-COO-\langle\rangle(Cl)-CN$ | 5 | |

Figure 4A:
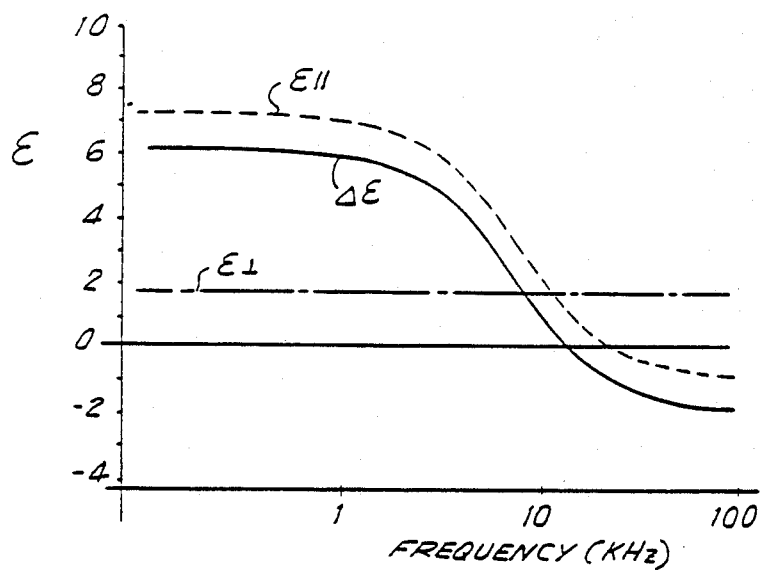
FIGS. 4(a-e) show characteristics of the liquid crystal panel and the printing apparatus in accordance with the invention.

FIG. 4(a) shows frequency-dependent variations in the dielectric anisotropy of the liquid crystal material according to the Table. The dielectric anisotropy $\Sigma_\perp$ in the transverse direction of the liquid crystal molecule is substantially 1.8 and free from variations due to frequency, while the dielectric anisotropy $\Sigma_{11}$ in the longitudinal direction of the molecules is positive when the frequency is low and negative when the frequency is high. The overall dielectric anisotropy $\Delta\Sigma = \Sigma_{11} - \Sigma_\perp$ is positive when the frequency is low, is zero when the frequency is approximately 13 KHz, and is negative when the frequency is higher than approximately 13 KHz. Therefore, when the liquid crystal panel is driven at a low frequency, the longitudinal direction of the liquid crystal molecules is oriented perpendicularly to the substrates, and when the liquid crystal panel is driven at a high frequency, the longitudinal direction of the liquid crystal molecules is oriented parallel to the substrates.

To the liquid crystal material according to the present invention is further added 2 to 3% of an optically active agent which is defined by the following formula:

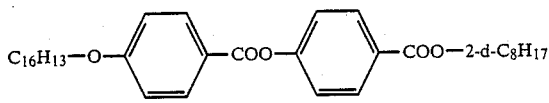

The resultant liquid crystal material is of a cholesteric phase having a long helix pitch of about 4 microns.

The liquid crystal panel 12 thus constructed has a low relaxation frequency of 5 KHz at 25° C., and thus can be driven with ease with low power consumption. The dielectric anisotropy at a low frequency is large, that is, 6 at 500 Hz and 5 at a higher frequency of 70 KHz, a value sufficient for controlling the orientation of the molecules of the liquid crystal material 66. The viscosity of the liquid crystal molecules is low, being about 10 CPS. When driven at a high frequency of 70 KHz, the liquid crystal material exhibits a sufficiently high response. When the liquid crystal panel is driven at a voltage of 30V and a low frequency of 500 Hz or a high frequency of 70 KHz in an ambient at 30° C., the liquid display panel operates in rise and fall times in the range of from 0.1 to 0.5 ms, a figure two digits faster than the response speed of an ordinary liquid crystal panel which ranges from a few tens to a few hundred ms. The printing apparatus A (FIG. 1) according to the present invention is thus operable at a high response speed, and the printing system incorporating the printing apparatus of the invention is able to operate at a high speed.

Figure 4B:
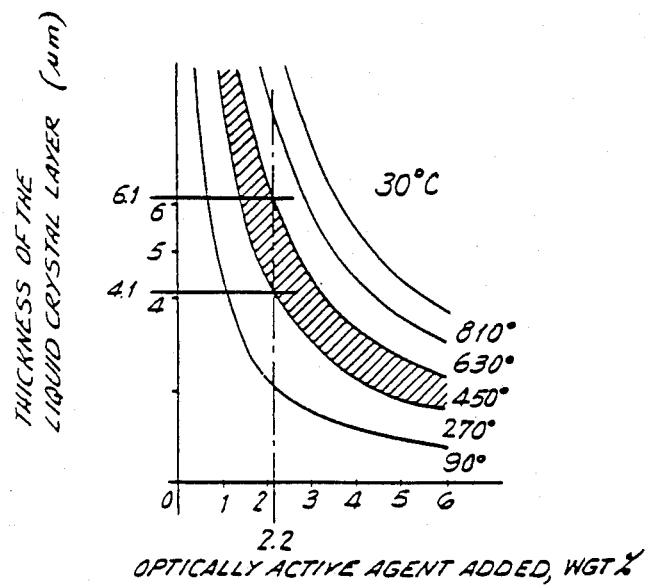
Figure 4C:
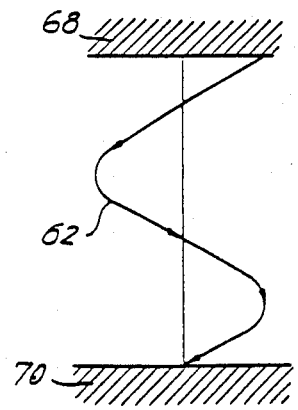

FIG. 4(c) is illustrative of a liquid crystal construction of the liquid crystal panel 12 in accordance with the present invention. The substrates 68, 70 are treated by rubbing or vacuum evaporation of SiO or SiO$_2$ to orient the liquid crystal molecules. Where the substrates are to be treated by rubbing, they should be rubbed downwardly in a direction normal to the sheet of the drawings. The upper and lower substrates 68, 70 may be replaced with each other. The upper and lower substrates 68, 70 may be put under an equivalent condition by way of vacuum evaporation of SiO or SiO$_2$. By thus orienting the upper and lower substrates 68, 70 the liquid crystal molecules are oriented in their upper and lower layers as shown in FIG. 4(c). More specifically, the liquid crystal molecules 62 are rotated through about 450°.

FIG. 4(b) illustrates the relationship between the concentration of the added optically active agent and the angle of rotation of the liquid crystal molecules 66 correlated to the thickness of the liquid crystal layer. The liquid crystal molecules 66 are twisted 450° in the hatched region. When the added optically active agent is of 2 wt %, the thickness of the liquid crystal layer needs to be in the range of from about 4 to 6 microns, and when the optically active agent is of 3 wt %, the thickness of the liquid crystal layer is required to range from about 3 to 4.5 microns. The thickness determination can be effected simply by either determining the interval of the liquid crystal panel and then the concentration of the optically active agent, or determining the amount of the optically active agent to be added and then the thickness of the layer of the liquid crystal panel 12.

Figure 4D:
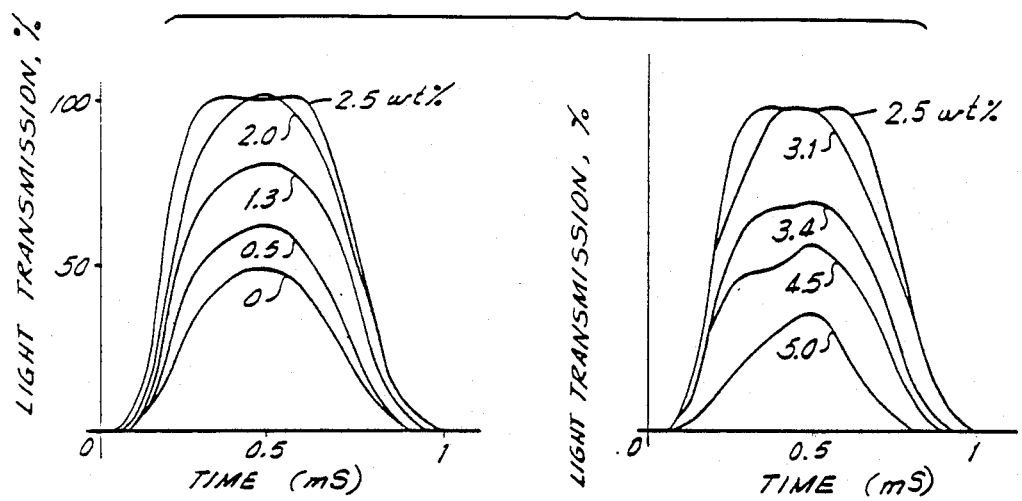

Response speeds of the liquid crystal panel when different amounts of optically active agent are added are shown in FIGS. 4(d). During an interval of from 0 to 0.5 ms, the liquid crystal panel 12 is supplied with a signal to open the light valves, and during an interval of from 0.5 to 1 ms, the liquid crystal panel 12 is supplied with a signal to close the light valves. When no optically active agent is added, or the liquid crystal molecules are oriented or twisted 90°, the ratio of transmission of light through the liquid crystal panel is on the order of 50%, and the response speed is low. Where the added amount of the optically active agent ranges from 2.0 to 3.0 wt %, that is, the liquid crystal molecules are twisted about 450°, the ratio of light transmission is 100%. With the added optically active agent is more than 3.0% and the liquid crystal molecules are oriented more than 630°, the light valves of the liquid crystal panel operate at a lower response speed, and the light transmission ratio falls short of 100%.

Figure 4E:
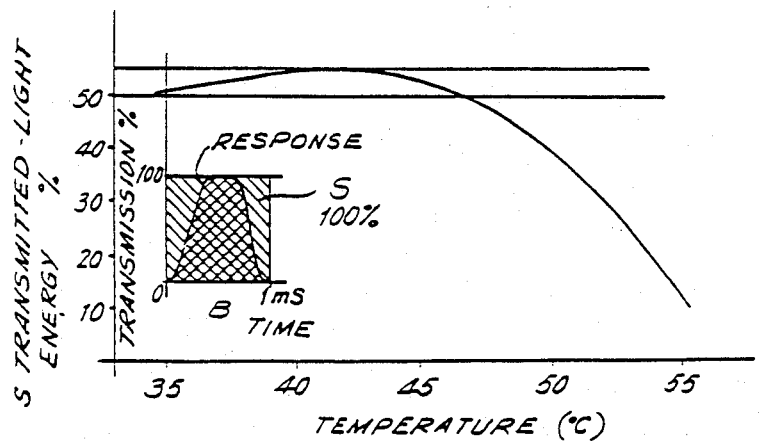

FIG. 4(e) is a graph of temperature vs. transmitted-light energy characteristics plotted when an electric field of about 30V is applied to the liquid crystal panel, thus fabricated, at a high frequency of about 70 KHz to open the light valves for light transmission. The vertical axis of the graph represents relative values for the energy S of light transmitted. Additionally, the transmitted-light energy S is defined from a small graph in FIG. 2(e). In the small graph, the abscissa B indicates time (m sec.) and the ordinate indicates the ratio of light transmission. In the case where the light valves are opened during an interval of from 0 to 1 ms, it is ideal if the ratio of light transmission is 100% at 0 ms and remains 100% till 1 ms passes. In such an ideal case, the light energy S transmitted through the liquid crystal shutter is shown as an area of the quadrangle wherein the abscissa indicating time is 0–1 ms and the ordinate indicating the ratio of light transmission is 0–100%. On the other hand, the liquid crystal light valves are opened during an interval of 0–0.5 ms and shut during an interval of 0.5–1 ms. As a result, the response of the light transmitted through the light valves is shown by a curve in the small graph. Therefore, the light energy transmitted through the light valves is shown as an area of a checked portion surrounded by the curve indicating the light response. The ratio of thus obtained area to the aforementioned ideal area is defined as a transmitted-light energy S. Study of the graph indicates that the liquid crystal panel 12 allows a maximum amount of light to be transmitted therethrough when its temperature was in the range of from 35° C. to 47° C., and the energy intensity of the light transmitted through the liquid crystal light valves is reduced when the temperature is outside the above range. This is the case when the voltage applied to the liquid crystal panel is anywhere between 5 and 40V, and the high-frequency electric field has a frequency ranging from 20 KHz to 300 KHz. Furthermore, the above relationship as shown in FIG. 4(e) remains unchanged when the cell thickness ranges from 3 to 12 microns. As shown in FIG. 2, the liquid crystal panel 12 is equipped with the heater 42 and the temperature sensor 44 which are connected to the heater controller 46 to thereby provide a feedback system for controlling the liquid crystal panel 12 so as to be maintained at a constant temperature. A measured temperature was 25° C.

The liquid crystal panel 12 of the above structure is excellent in its ability to resist environmental attack and aging. For example, molecule orientation and the current consumption requirement were not changed when the liquid crystal panel was left for one month at 60° C. and 90% RH. No problem occurred after the liquid crystal panel had been left in an atmosphere of 80° C. for three months. Also, the liquid crystal panel suffered from no malfunctions when it was left in an atmosphere of −30° C. for one week.

The liquid crystal panel 12 according to the present invention is completely different from conventional liquid crystal panels of the DSM (Dynamic Scattering Mode) type, and is feasible for practical use from the standpoints of reliability and aging. Prior liquid crystal display panels of the DSM type lacked sufficient reliability as a dopant is added to the liquid crystal material for optical dispersion, and consumed a large amount of current. Therefore, such conventional LCD panels failed to find widespread use. The printing apparatus according to the present invention utilizes a liquid crystal material of a twisted nematic structure, and has highly improved reliability and current consumption requirements. The printing apparatus of the invention is able to effect high-speed printing by maintaining the liquid crystal panel 12 at a constant temperature.

DRIVING OF THE LIQUID CRYSTAL PANEL

Figure 5A:
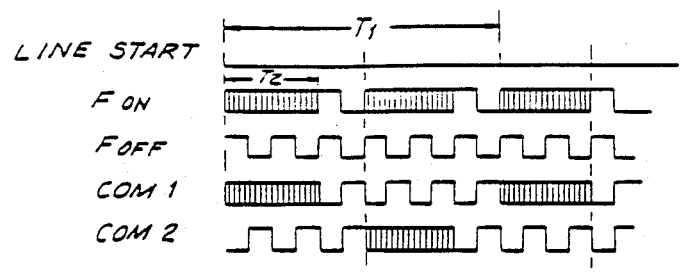
FIGS. 5(a,b) are waveform diagrams for operation of the liquid crystal panel of FIG. 4.

The liquid crystal panel is driven statically or dynamically with ½ duty cycle, that is, alternately at low and high frequencies for high speed switching. FIG. 5(a) is illustrative of the way in which the liquid crystal light valves are driven, and more detailedly, of waveforms generated where the liquid crystal light valves are driven dynamically with ½ duty cycle. The detail will be described in the explanation of FIG. 5(b) and hence FIG. 5(a) will be briefly described here.

$T_1$ represents a repeated cycle, and the drive waveforms of COM-1 and COM-2 respectively appear at every $T_1$ period. Fon represents a signal to be applied for opening the liquid crystal light valves. $T_2$ represents a time-interval in which a high-frequency signal is applied for opening the liquid crystal light valves. Foff stands for a low-frequency signal to be applied for closing the liquid crystal light valves. Line Start signal is a timing signal whose period is the same as the repeated period $T_1$.

The liquid crystal molecules have a negative dielectric anisotropy $\Delta\Sigma$ at a high frequency and a positive dielectric anisotropy $\Delta\Sigma$ at a low frequency. The liquid crystal molecules are oriented parallel to the upper and lower substrates 68, 70 and twisted through a certain angle. The upper and lower polarizers are placed above and below the liquid crystal panel 12 to allow passage of light therethrough while no electric field is imposed on the liquid crystal panel 12, the upper and lower polarizers having axes of polarization crossed at about 90°. When the frequency of the electric field applied to the liquid crystal molecules is low and the dielectric anisotropy $\Delta\Sigma$ is positive, the longitudinal axes of the liquid crystal molecules extend substantially normal to the upper and lower substrates 68, 70 to cut off the light falling on the liquid crystal panel, which is therefore not transmitted to the photosensitive drum B (FIG. 1). Conversely, when the electric field applied to the liquid crystal molecules has a higher frequency, with the dielectric anisotropy being negative, the longitudinal axes of the liquid crystal molecules are directed substantially parallel to the upper and lower substrates 68, 70 whereupon the light falling on the liquid crystal panel 12 is allowed to pass therethrough and reach the photosensitive drum B (FIG. 1).

Figure 5B:
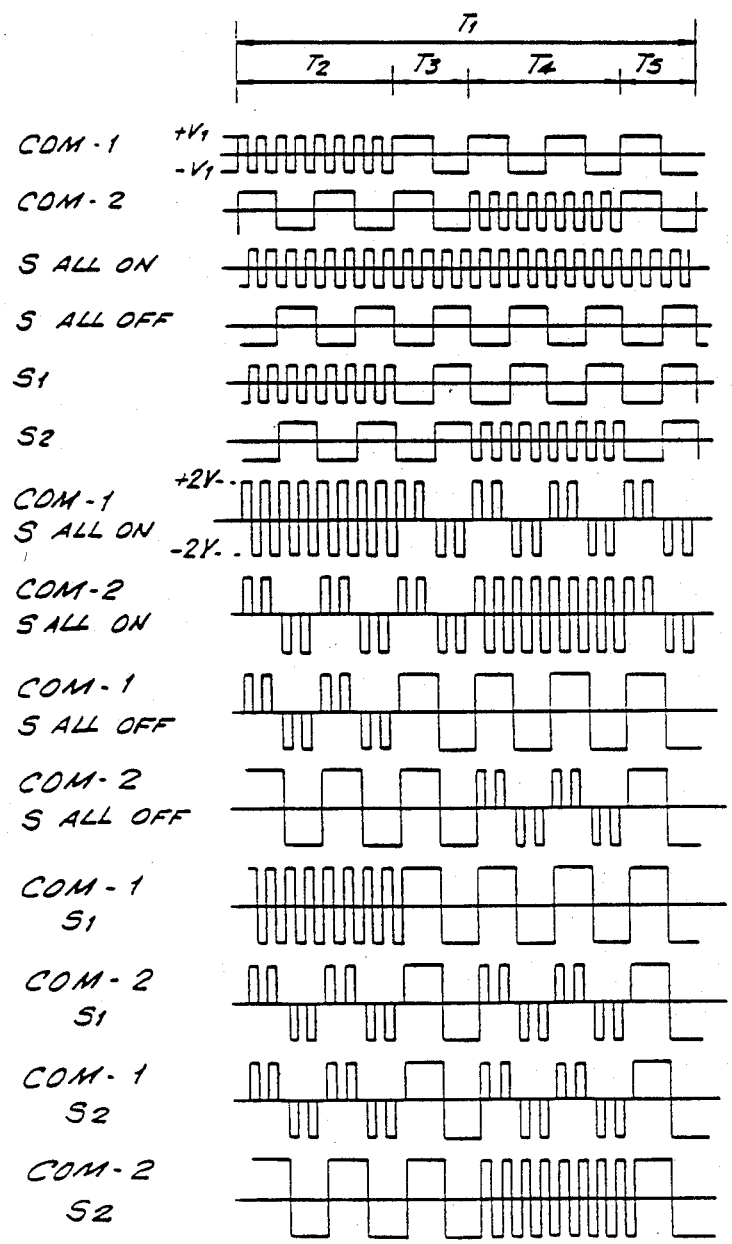

FIG. 5(b) shows the waveforms of signals applied to the liquid crystal panel when the latter is driven at ½ duty cycle. Designated at COM-1, COM-2 are scanning signals applied to the scanning electrodes, and $T_1$ is a single period. The scanning signal COM-1 will first be described. During a first half period $T_2$, a high-frequency voltage having a peak value ranging from $+V_1$ to $-V_1$ is applied to select the scanning signal COM-1. During a next interval $T_3$, a low-frequency voltage is applied and the scanning signal COM-1 is not selected. A low-frequency voltage having a peak value of $+V_1 - -V_1$ is also applied during a next half period $(T_4+T_5)$ and the scanning signal COM-1 is not selected. The scanning signal COM-2, is not selected during a first half period $(T_2+T_3)$ in which a low-frequency voltage with a peak value of from $+V_1$ to $-V_1$ is applied. During a latter half period $T_4$, a high-frequency voltage having a peak value of $+V_1 - -V_1$ is applied, and the scanning signal COM-2 is selected.

More specifically, the COM-1 line is selected for the interval of time $T_2$ within the period $T_1$, and the COM-2 line is selected for the time interval $T_4$ in the period T1. Neither COM-1 nor COM-2 lines are selected within the intervals $T_3$, $T_5$. Experiments were conducted in accordance with the present invention with the period $T_1$ being 2 ms, $T_2$ and $T_4$ being 0.6 ms, and $T_3$ and $T_5$ being 0.4 ms. The reason for imposing low-frequency voltages during the intervals $T_3$, $T_4$ to close the liquid crystal shutter is to gain a better shutter effect.

Designated at Sall On is the waveform of a voltage applied to the segments COM-1, COM-2 to light the crossing of the COM-1, COM-2 lines. More specifically, during the interval $T_2$, a voltage is applied which has a peak value of from $+V_1$ to $-V_1$ and which is opposite in phase to the high-frequency voltage of the COM-1 and COM-2 signals. Indicated at COM-1 Sall ON is the waveform of a voltage applied to a liquid crystal at the crossing of the scanning electrode 76 COM-1 and the signal electrode 78 to which the Sall ON voltage is applied. To the liquid crystal at the above crossing is applied a high-frequency voltage having a resultant composite peak value of from $2V_1$ to $-2V_1$ during the interval of $T_2$, and the dielectric anisotropy $\Delta\Sigma$ negative and the longitudinal axes of the liquid crystal molecules are oriented parallel to the upper and lower substrates 68, 70 whereupon the light valve 64 is open to allow the light falling on the crossing to be transmitted to the photosensitive drum B (FIG. 1). During the interval $T_4$, a high-frequency voltage with a peak value of from $2V_I$ to 0 and a high-frequency voltage with a peak value of from 0 to $-2V_1$ are applied for cutting off light. As a whole, the light valves are open during the interval $T_2$ to pass light of an energy large enough to expose the photosensitive drum B, whereupon a latent image corresponding position ally to the crossing in the liquid crystal panel is formed on the photosensitive drum B.

The composite waveform of a signal applied to the liquid crystal at the crossing of the scanning electrode 76 COM-2 and the signal electrode 78 to which the Sall On voltage is applied is indicated by COM-2 Sall ON. During the former portion of the period $T_1$, that is, the scanning interval $T_2$ for the COM-1 electrode, the liquid crystal light valve is closed, and during the latter portion of the period $T_1$, that is, the scanning interval $T_4$ for the COM-2 electrode, the liquid crystal light valve is open. Therefore, during the interval $T_4$ in which the COM-2 electrode is selected, the photosensitive drum B is irradiated through the liquid light valve 64 with an optical energy large enough to form a latent image positionally corresponding to the above-mentioned crossing.

Briefly summarized, when the Sall ON signal is applied to the signal electrode, the light valve located at the crossing of the signal electrode and the scanning electrodes COM-1, COM-2 are opened to allow passage therethrough of an optical energy sufficiently large for forming a latent image on the photosensitive drum.

A signal Sall OFF in FIG. 5(b) is applied to the signal electrode 78 to close the light valve 64 at the crossing of the scanning electrodes 76 COM-1 and COM-2.

Designated at COM-1 Sall OFF is a composite signal waveform of the signals COM-1 and Sall OFF applied to the liquid crystal at the crossing of the scanning electrode 76 and the signal electrode 78 to which the signal Sall OFF is applied. During the former portion of the period $T_1$, that is, the scanning interval $T_2$ for the COM-1 electrode, the light valve is closed. During the latter portion of the period $T_1$, *that is, the scanning time T4* for the COM2 electrode, the composite waveform is of a low frequency having a peak value of from $2V_1$ to $-2V_1$. At this time, the dielectric anisotropy is positive, and the liquid crystal molecules have their longitudinal axes extending substantially perpendicularly to the upper and lower substrates 68, 70 to thereby block passage of light. As a consequence, the light valve at the crossing of the scanning electrode COM-1 and the signal electrode to which the Sall OFF signal is applied is closed throughout the period $T_1$, with the result that no latent image is formed on the photosensitive drum at such crossing.

A composite signal waveform COM-2 Sall OFF in FIG. 5(b) is applied to the crossing of the scanning electrode 76 COM-2 and the signal electrode 78 on which the Sall OFF signal is imposed. As with the COM-1 Sall OFF signal, the signal COM-2 Sall Off closes the light valve throughout the period $T_1$ preventing light from being transmitted onto the photosensitive drum. More specifically, when the signal Sall OFF is applied to the signal electrode 78 the light valves 64 at the crossings of this signal electrode 78 and the scanning electrodes 76 COM-1 and COM-2 are closed throughout the period $T_1$ and no optical energy reaches the photosensitive drum.

FIG. 5(b) also shows a signal $S_1$ for driving the signal electrodes 78. A composite signal waveform COM-1 $S_1$ is applied to the liquid crystal at the crossing of the scanning electrode COM-1 and the signal electrode to which the signal $S_1$ is applied, and a composite signal waveform COM-2 $S_1$ is applied to the liquid crystal at the crossing of the scanning electrode 76 COM-2 and the signal electrode 78 to which the signal $S_1$ is applied. Study of these composite signal waveforms indicates that the light valve at the crossing of the signal electrode 78 to which the signal $S_1$ is applied and the scanning electrode 76 COM-1 is open to permit passage of light, and the light valve 64 at the crossing of the signal electrode 78 and the scanning electrode 76 COM-2 is closed to prevent light from passing therethrough.

FIG. 5(b) also shows a signal $S_1$ for driving the signal electrodes 78. A composite signal waveform COM-1 $S_2$ is applied to the liquid crystal at the crossing of the scanning electrode 76 COM-1 and the signal electrode 78 to which the signal $S_2$ is applied, and a composite signal waveform COM-2 $S_2$ is applied to the liquid crystal at the crossing of the scanning electrode 76 COM-2 and the signal electrode 78 to which the signal $S_2$ is applied. Study of these composite signal waveforms indicates that the light valve at the crossing of the signal electrode 78 to which the signal $S_2$ is applied and the scanning electrode 76 COM-1 is open to permit passage of light, and the light valve 64 at the crossing of the signal electrode 78 and the scanning electrode 76 COM-2 is closed to prevent light from passing therethrough.

The peak value $V_1$ is in the range of from a few to a few tens of volts. A prototype of the apparatus according to the present invention was designed to be driven by signals having a peak value $V_1$ of 30V. The low-frequency signal was a frequency of a few hundreds Hz, and the high-frequency signal was a frequency of from a few tens to a few hundred KHz. The frequency in the prototype was 130 KHz. The liquid crystal panel operates in the rise and fall times of 0.1 to 0.5 ms and the period $T_1$ is a few ms. The period $T_1$ was 2 ms in the prototype.

With the apparatus of the invention thus driven at ½ duty cycle, the drivers 14 (FIG. 2) may be half as many as those which would be statically driven.

Since the peak voltage value is a few tens of V, the drivers can be fabricated on a highly integrated MOS circuit such as CMOS, PMOS, NMOS at a reduced cost.

The number of power supply levels in the power supply need only be two by equalizing high- and low-frequency voltages as in the described embodiment of the present invention.

DRIVER

In a prototype, 2,000 microshutters (light valves) were fabricated on the liquid crystal panel and arranged at a pitch of 100 microns in a straight array for a length of 20 cm. Integrated drive circuits were prepared for opening and closing the microshutters in response to time-series picture element data, and were mounted on the liquid crystal panel. Since a single integrated driver circuit had fifty output drivers, a total of forty integrated driver circuits were disposed with twenty circuits located on each side (FIG. 2a) of the liquid crystal panel.

Figure 6C:
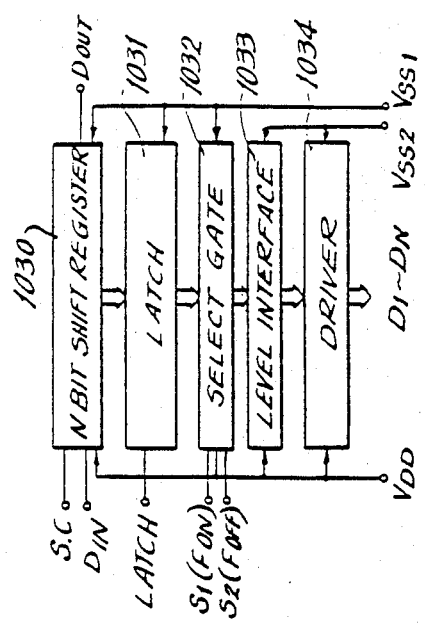
FIG. 6(b,c) are functional diagrams of liquid crystal driver circuits for the printing apparatus in accordance with the invention.
FIG. 6(a) is waveforms associated with operation of the circuit of FIG. 6(b)
Figure 6A:
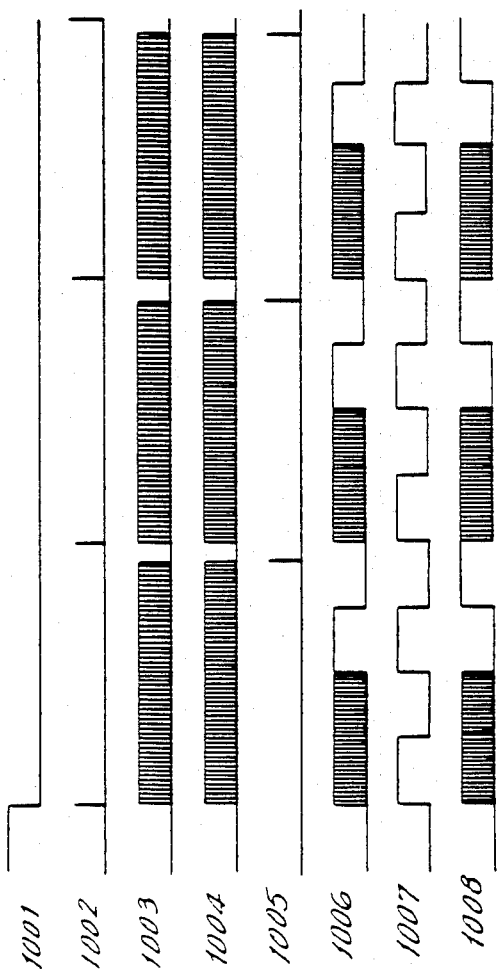
Figure 6B:
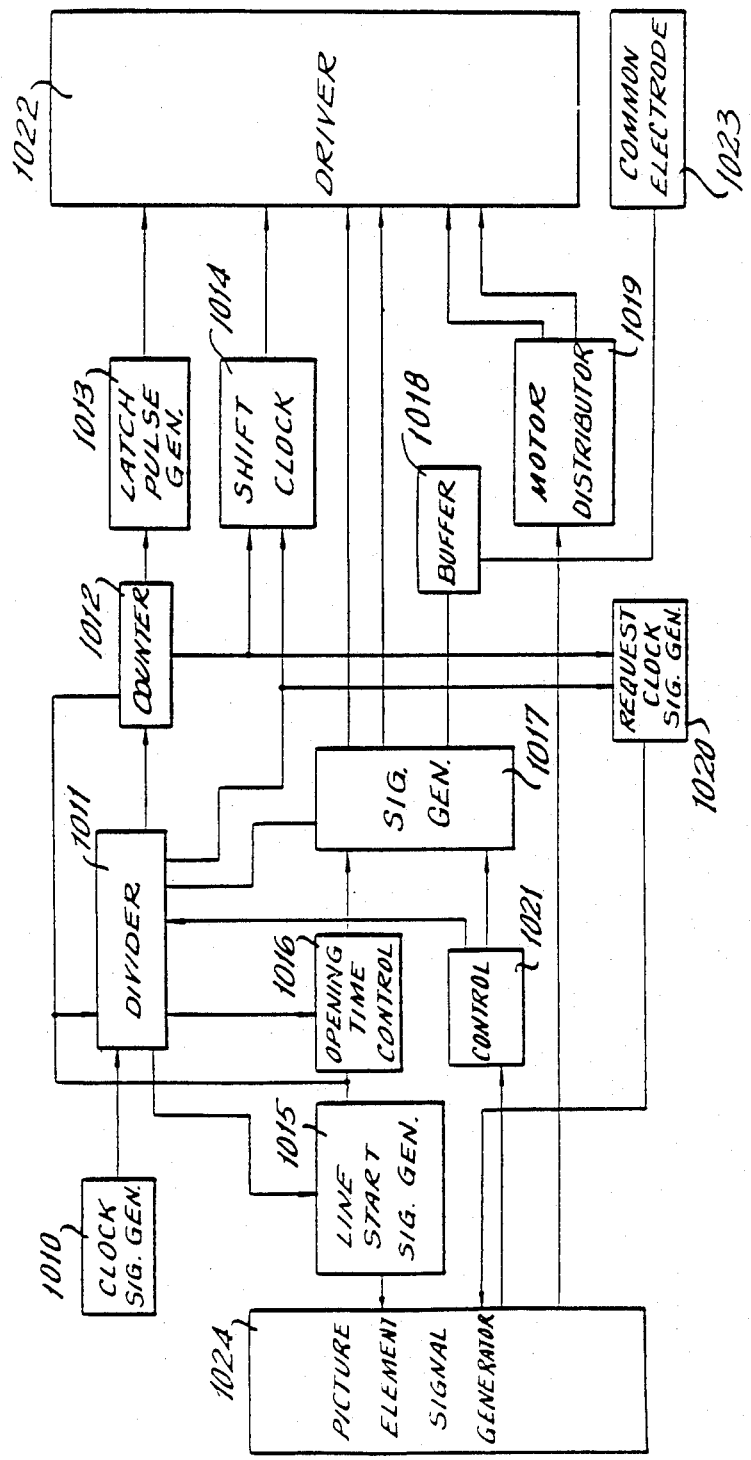

FIGS. 6(a)–6(c) are directed to a static driving. FIG. 6(a) is a timing chart for various signal waveforms required to drive the integrated driver circuits, and FIG. 6(b) is a block diagram of a circuit for generating such signal waveforms. Designated at waveform 1001 is a reset signal for starting operation, at waveform 1002 a line start signal indicative of the beginning of data for one line, and at waveform 1003 a request clock requesting data, the clock being composed of 2,000 pulses for one line in synchronism with the line start signal. Data is received in synchronism with the clock signal. Also indicated at waveform 1004 is a shift clock for transferring data from a shift register in the integrated driver circuit, at waveform 1005 latch pulses for latching data immediately after data has been transferred, waveforms driving 1006, 1007, 1008 are to be applied to the liquid crystal panel, the waveform 1008 being a common electrode signal. When the signal 1006 is ON, the liquid crystal microshutters are open, and when the signal 1007 is OFF, the liquid crystal microshutters are closed. The ON signals and common electrode signal are composed of a combination of a high frequency fh and a low frequency fl and are inverted in phase with respect to each other. The OFF signal has a low frequency in phase with the frequency fl of the ON signals. An interval of the high frequency fh in one period of the ON signals is called an opening interval.

A circuit arrangement for generating such signals will now be described. A fundamental clock signal 1010 of 4.2 MHz is frequency-divided by a divider 1011 to produce a variety of signal waveforms. A signal generator 1015 generates a line start signal having a period of 2 ms for synchronizing all other signals. A counter 1012 counts 2,000 pulses, and a request clock generator 1020 produces a request clock which is supplied to an external time-series picture element signal generator 1024, to which the line start signal is also delivered. Data is supplied from the picture element generator 1024 in synchronism with the request clock to a motor distributor 1019, from which the data is fed to an interdigital integrated driver circuit 1022.

An opening time is determined by an opening time control 1016, and the ON, OFF and common electrode signals are produced by a signal generator 1017 and delivered to the integrated driver circuit 1022. A pulse generator 1013 generates latch pulses, and a clock generator 1014 generates a shift clock, these pulses and clock signals being fed to the integrated driver circuit 1022. The common electrode signal is converted by an output buffer 1018 into a signal of 30V which is applied to a common electrode 10. A control 1021 is receptive of a reset signal fed from the picture element generator 1024 for starting and stopping operation of various parts.

FIG. 6(c) is a block diagram of an alternative driver of a less costly arrangement for driving the signal electrodes of the liquid crystal panel, the driver having N bits. Although the number N should preferably be large, it is a few tens in practical applications. A signals for driving the signal electrodes is supplied to an input DIN, and data from the input DIN is transferred through a shift register 1030 by a shift clock S.C. After the data has been transferred, the data is latched in a latch 1031 by a LATCH signal. A select gate 1032 serves to select lighting or non-lighting dependent on the data latched. The data is then converted by a level interface 1033 into a drive signal Vss2 to drive an N-bit driver 1034 for driving the liquid crystal panel. A single such integrated drive circuit can drive N signal electrodes. One driver IC can drive N signal electrodes for static driving, and can drive 2N signal electrodes for ½ duty cycle driving. The driver may be composed of an integrated circuit of TTC, I$^2$L or a MOS-type integrated circuit of EDMOS, CMOS, PMOS, NMOS or the like.

With the N-bit driver thus constructed, the printing apparatus in accordance with the present invention is small in size and less costly as the driver can be mounted easily and is of an IC construction. The driver can be interfaced easily to facilitate opening and closing of the light valves in response to external signals.

LIGHT SOURCE

Figure 7A:
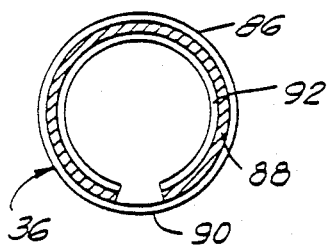
FIG. 7(a) is a sectional view of a fluorescent lamp in the printing apparatus in accordance with this invention.

The lamp 36 (FIG. 2) in the printing apparatus in accordance with the present invention may be a tungsten lamp, xenon lamp, or a halogen lamp, but is preferably a fluorescent lamp. FIG. 7(a) shows a fluorescent lamp used as the lamp 36 (FIG. 2) in the printing apparatus A (FIG. 1). The fluorescent lamp includes a glass tube 86 having therein a reflecting layer 88 with a light discharge aperture 90 and a layer 92 of fluorescent material deposited on an inner surface of the reflecting layer 88. Light emitted from the fluorescent material layer 92 is reflected by the reflecting layer 88 and passes through the aperture 90 opened to illuminate the light valves 64 (FIG. 3) of the liquid crystal panel 12 (FIG. 2). The fluorescent lamp 36 with the aperture 90 is effective in transmitting intensive light to the photosensitive drum B (FIG. 1).

Figure 7B:
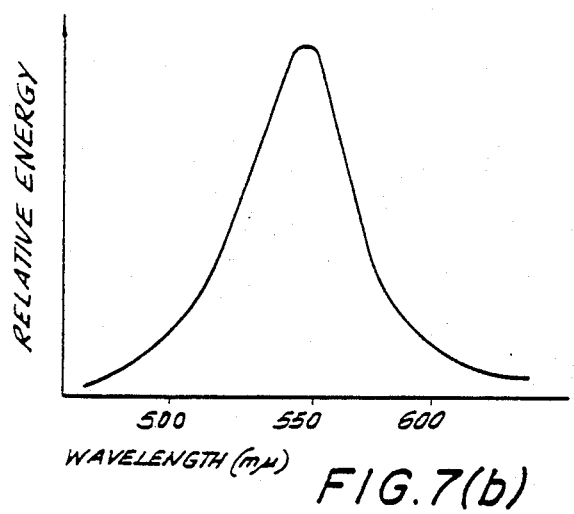
FIG. 7(b,c) are performance characteristics of the fluorescent lamp of FIG. 7(a)

FIG. 7(b) shows a wavelength characteristic of a fluorescent material 92 used in a prototype in accordance with the present invention, the graph having a vertical axis representative of relative energy of the fluorescent material 92 and a horizontal axis of wavelengths. The fluorescent material should have wavelengths matching those of the photosensitive material on the photosensitive drum B (FIG. 1), relative light discharge energy in a certain wavelength range, reduced half-value width, high brightness, and a high longevity, the material used being $BaMgAl_{11}O_{14}FeMu$. The fluorescent material may have several wave length peaks one of which is highest and sensed by the photosensitive material of the photosensitive drum B (FIG. 1), the other peaks being negligible.

Where a fluorescent lamp, constructed as shown in FIG. 7(a), and a fluorescent material described with reference to FIG. 7(b) are employed, the signal-to-noise ratio of printing is high for printing clear copies.

DRIVING OF THE LAMP

Figure 7C:
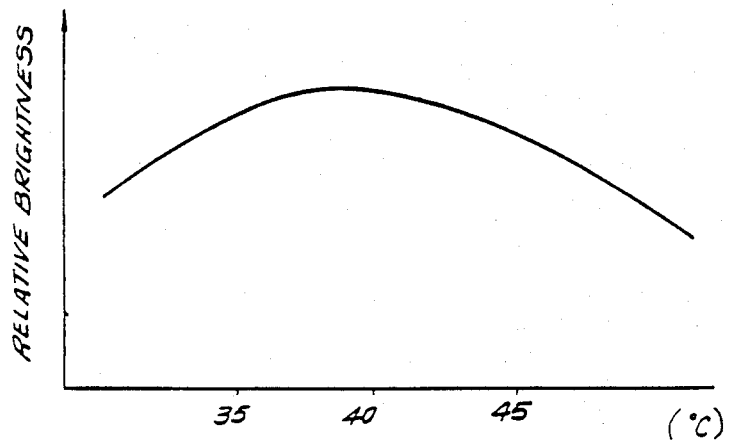

FIG. 7(c) shows the relationship between the temperature of the lamp tube wall and relative brightness. The brightness of the fluorescent lamp is maximum when the temperature of the lamp tube wall ranges from 35° C. to 45° C. The temperature sensor 52 (FIG. 2) is attached to the lamp tube wall to detect the temperature thereof at all times for feedback control of the lamp driving system 60 (FIG. 2) to maintain the lamp brightness constant at all times.

The lamp driving system 60 is coupled to the fan 58 (FIG. 2) for supplying air from outside of the printing apparatus into the frame 26 (FIG. 2) through the heater 56 (FIG. 2), an arrangement which is effective in keeping the lamp tube wall at a constant temperature at all times. The lamp tube is filled with an excessive amount of mercury to compensate for a reduction in the mercury vapor pressure due to reaction between the mercury and materials in the lamp tube. Such mercury tends to be deposited in the aperture 90 (FIG. 7(a)) which can be cooled easily, thereby reducing the light emission output. However, the fan 58 (FIG. 2) delivers air into the frame 26 to prevent the aperture 90 (FIG. 7(a)) from being cooler than the other tube portions and hence prevents mercury from being deposited in the aperture 90. Accordingly, any reduction in light emission is held to a minimum.

SELF-FOCUSING LENS ARRAY

The self-focusing lens array 40 (FIG. 2) is located below the liquid crystal cell 12 of the printing apparatus in accordance with the present invention. An example of the self-focusing lens array 40 is the array of glass fibers for focusing light rays, having the commercial name of Selfoc Lens Array (manufactured by Nihon Ita Garasu K.K.).

Figure 8A:
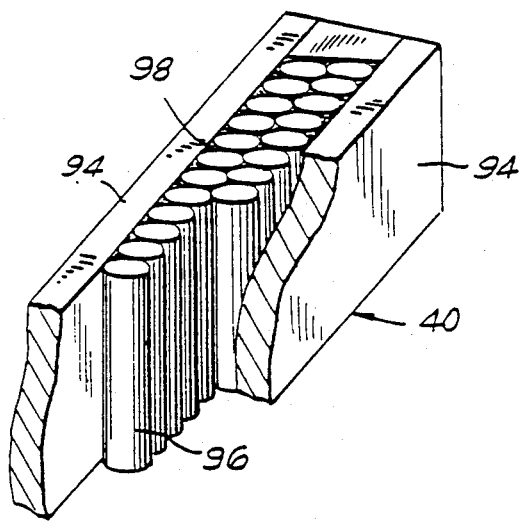
FIGS. 8(a)-(f) illustrate a preferred disposition of the light valves in a liquid crystal panel relative to self-focusing lens array.

FIG. 8(a) illustrates such a self-focusing lens array 40 employed in the printing apparatus of the present invention. The self-focusing lens array 40 comprises FRP (Fiber Reinforced Plastic) side plates 94, the self-focusing lenses 96 sandwiched between the side plates 94, and a mass of black silicone resin 98 filled in the spaces or gaps between the side plates and lenses. The self-focusing lenses 96 are substantially cylindrical in shape and have respective optical axes aligned in 1 to 1 correspondence with those of the light valves 64 (FIG. 3) of the liquid crystal panel 12 (FIG. 2). Each self-focusing lens 96 has a cross-sectional area, normal to its optical axis, approximately equal to the area of a corresponding one of the light valves 64 of the liquid crystal panel. The self-focusing lenses are small in size as they are approximately a few millimeters to a few centimeters long parallel to the optical axes thereof. The optical fibers of the self-focusing lenses have a self-focusing capability with a graded refractive index such that a beam of light entering one end of the self-focusing lens travels along a zigzag path around the optical axis. Thus, the glass fibers per se are equivalent in function to a lens. The self-focusing lens array 40 employed in one embodiment, is composed of lenses of such characteristics put together and aligned in 1 to 1 correspondence with the small windows or light valves of the liquid crystal panel. The overall height of the self-focusing lens array is in the range of (rough order of magnitude) a few millimeters to a few centimeters, and the length and width thereof are at least equal to the length and width of an area in which the light valves 64 (FIG. 3) of the liquid crystal panel are arranged.

Figure 8B:
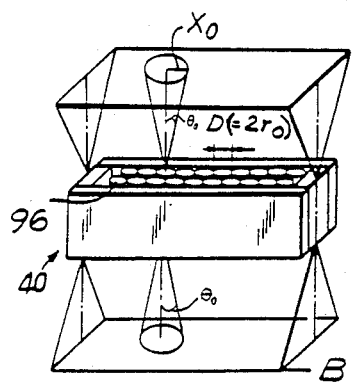

Further embodiments of the image formation system of the invention are based upon the manner of formation of the images and the optical parameters involved as illustrated in FIG. 8(b). There, light originating at a source such as an open light valve in liquid crystal panel 12 of FIG. 3, is projected by lens array 40 onto the surface of reproducing drum B (FIG. 1) as an erected image of the same size. The index of refraction "n" of each self-focusing lens 96 varies in the direction of the radius vector of the lens according to the equation:

$$n = n_0(1 - (A/2)r^2)$$

where A is a distributed constant and n0 is the index of refraction on the axis of the lens. The visual field of the self-focusing lens of FIG. 8(b) has a radius $X_0$ as follows:

$$X_0 = r_0 \sec((z_0\pi)/P)$$

where $P = 2\pi/A$, $r_0$ is the radius of the lens ($D = 2r_0$). Given the degree of overlap M of the fields of adjacent lenses as $M = X_0/D$, the level of light transmitted by the self-focusing lens and the variation of the transmitted light are respectively related thereto as shown in FIGS. 8(c) and 8(d), where N is the number of rows of individual lenses 96 in self-focusing lens 40.

Figure 8C:
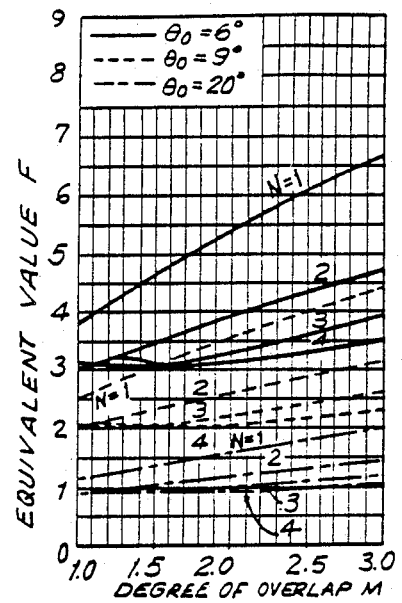

The level of light transmitted along the length of the self-focusing lens array is shown in FIG. 8(c), where the degree of overlap M is plotted as the abscissa, and the equivalent value F is plotted as the ordinate. The level of the transmitted light is the inverse square of the equivalent value F. The angle of origin $\theta_0$ the angle of light received by and emitted from of each self-focusing lens is given the values $\theta_0 = 20°$, 9° and 6°. When $\theta_0$ is 20°, the light transmitted by the self-focusing lens array is brightest; when $\theta_0$ is 6°, the transmitted light is dimmest.

Figure 8D:
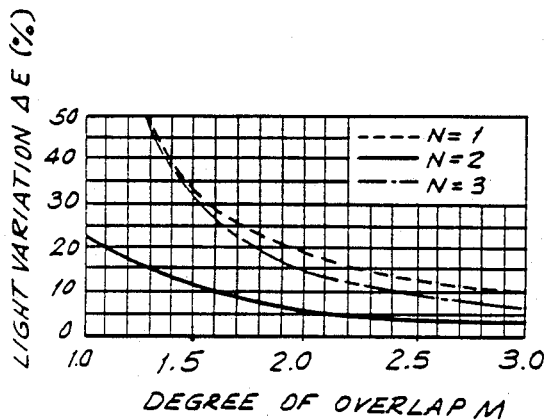

In FIG. 8(d) the deviation of transmitted light ΔE is shown for the value $\theta_0 = 20°$ which maximizes the transmission of light, where:

$$E = \frac{\text{largest amount of light on an image} - \text{smallest amount of light on an image}}{\text{smallest amount of light on an image}} \times 100.$$

In FIG. 8(d), the degree of overlap M is plotted as the abscissa and the deviation ΔE is plotted along the ordinate. It has been found that when $\theta_0$ is 9° or 6°, the trend of the curve lines is substantially the same as when $\theta_0$ is 20°. The variation of transmitted light thus reflects the range of intensities between the largest amount of light and the smallest amount of light which is transmitted to one image formed on the imaging surface.

The intensity of light transmitted to the imaging surface also varies as a function of the width of the self-focusing lens array. Reference is again made to FIG. 8(c), where the number of rows of self-focusing lenses in the array is designated N. In general, the larger the value of N, the smaller is the equivalent value F. Increasing N therefore results in a brighter image. However, as shown in FIG. 8(d), there is less deviation of transmitted light when there are two rows (N=2) then there is with a single row (N=1) and the deviation in transmitted light increases again when there are three rows (N=3). Therefore, when there are two rows (N=2), the least deviation in transmitted light is obtained.

In view of the above, it may be considered that the degree of overlap is related to the number of self-focusing lenses involved in the transmission of light from one light valve and that, therefore, the amount of light transmitted by the light valve varies as a function of the positions of the self-focusing lens relative to the light valve. According to the present invention, the deviation of the transmitted light, e.g., the difference between the largest and the smallest level of transmitted light, is smallest when N=2. The degree of overlap is then above 1.3 and the deviation of transmitted light is less than 15%, an amount which does not raise any problem in practical use. Since the brightness of the light transmitted by the lens is inversely proportional to the square of the equivalent value F, the intensity of the light decreases with an increase in the degree of overlap. Thus, the brightest lens, e.g., one in which the opening angle $(\theta = A \times n_0 \times r_0)$ is 20°, can provide an equivalent value F of above 1.2.

Figure 8E:
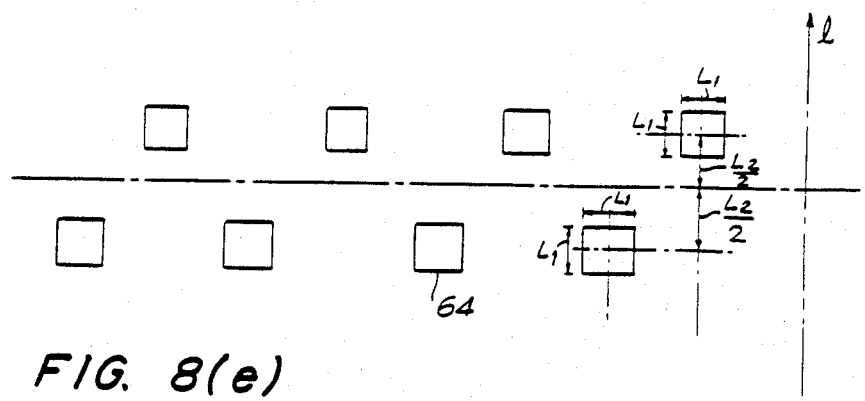
Figure 8F:
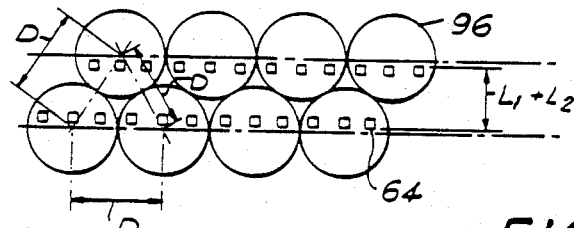

In the embodiment of FIG. 8(e), light valves 64 are disposed in two rows. Each light valve window is square, having a size of $L_1$ by $L_1$. In FIG. 8(f), the relative positions of a two-row lens array and a two-row light valve array are shown, with "D" being the distance between centers of adjacent self-focusing lenses 96 (on any side of the imaginary equilateral triangle which connects a lens in one row with abutting lenses in the adjacent row) in an arrangement which produces the brightest images of the light valves on the photosensitive drum. Departures from this arrangement yield dimmer images. Further, it has been found that when $L_1 + L_2 \leq D$, that is, when $L_1 + L_2$ is less than D, over 90 percent of the light transmitted to a given light valve 64 is transmitted by the self-focusing lens with which it is associated (see FIG. 8(f)). Good efficiency in light transmission is thus provided.

Use of the self-focusing lens array makes it possible to focus a non-magnified image on the photosensitive drum B (FIG. 2). The conventional spherical lens used in a copying machine has a resolving power which is poorer in its peripheral portion than in its central portion, and is large, as it is spherical in shape to reduce an amount of light transmission at its periphery. Since the distance between an object and an image plane ranges from 600 mm to 1,200 mm, such a prior art copying machine has been large in size. Its optical system is complex because a mirror, frame and the like are required, and thus is costly. The self-focusing lens array used in the printing apparatus of the present invention, however, has a resolving power which is uniform throughout its width and passes an amount of light uniformly across the width thereof. The self-focusing lens array is rectangular in shape, small in size and lightweight. The distance between an object and an image plane is small, in the order of 60 to 80 mm. The optical system is simple, compact and less costly.

HEATER

The heater 42 (FIG. 2) for keeping the temperature of the liquid crystal panel 12 constant in the printing apparatus A (FIG. 1) is now described in detail.

Figure 9:
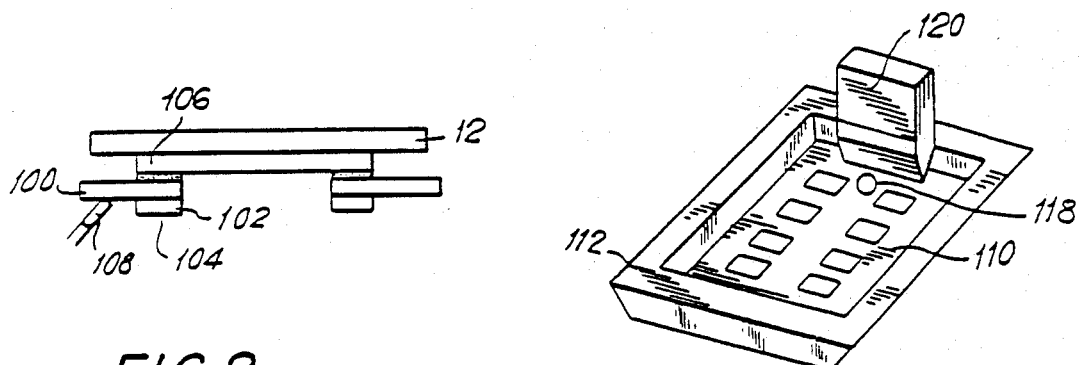
FIG. 9 is a side elevational view of a liquid crystal heater used with the liquid crystal panel of the printing apparatus in accordance with the invention.
Figure 10B:
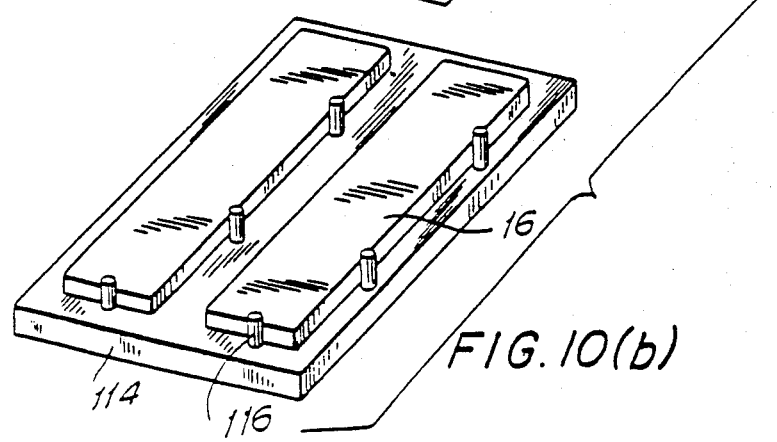

FIG. 9 is schematically illustrative of the heater 42 as it is attached to the liquid crystal panel 12. The heater comprises a metal plate 100 made of Al, Fe, Cu or the like and a support 102 having a resistor 104, the metal plate 100 being mounted on the liquid crystal panel 12 by a suitable fastening means 106 such as an adhesive, a double-sided adhesive tape or the like. The resistor 104 is formed by depositing a layer of carbon, silver or the like on the support 102 in the form of a sheet of glass or metal such as Al, Fe, Cu or the like by way of dipping, screen process printing, spraying, brushing, for example. The heater 42 generates Joule heat when an electric current passes through the resistor 104. The resistor 104 is commercially available as a conductive or resistive paste. The resistor 104 has a constant layer thickness and width such that its resistance is constant throughout. Heat generated when an electric current is passed through the resistor 104 is detected by a temperature detection means such as a thermistor, and a detected signal is delivered to the heater controller 46 (FIG. 1) which controls the heater 42 in a feedback control system to maintain the heater 42 at a constant temperature. Temperature detection means 108 is affixed to the metal plate 100 or the resistive layer 104 by an adhesive or a double-sided adhesive tape.

The liquid crystal becomes more viscous and slower in response when the temperature falls too low. When the temperature is too high, on the other hand, the liquid crystal becomes isotropic. When a constant voltage is applied to open and close the liquid crystal light valves 64 (FIG. 3), the latter should be driven while being kept within a certain temperature range. The heater serves to maintain the liquid crystal panel in an optimum temperature range for the driving of the liquid crystal panel. The heater also serves to prevent the light transmittance of the liquid crystal panel from varying and hence prevents the latent image on the photosensitive drum from being subjected to different densities and line thickness due to a temperature change of the liquid crystal panel 12 (FIG. 2).

ASSEMBLING PROCEDURE

Assembling of the printing apparatus A (FIG. 1) of the present invention is now described. FIGS. 10(a) through 10(i) are illustrative of an assembling procedure for the printing apparatus of the invention.

Figure 10A:
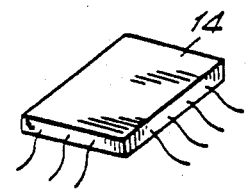
FIGS. 10(a-i) are drawings illustrating steps in production of a printing apparatus in accordance with the invention.

A mask pattern is prepared in the shape of leads of a liquid crystal driver 14 as shown in FIG. 10(a). The mask 110 and a mask fixture jig 112, and driver mount substrates 16, positioned on a guide plate 114 by guide pins 116, are positioned in mutual alignment, and a cream of solder 118 is printed on the substrate by a squeezee 120. The cream of solder 118 is composed of small balls of solder and an amount of flux which are mixed together at a suitable degree of viscosity.

Figure 10C:
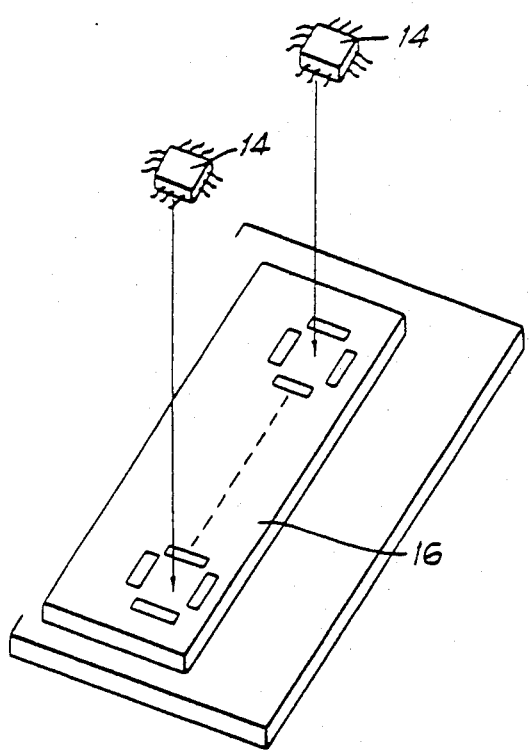

Then, as shown in FIG. 10(c), the driver ICs 14 (FIG. 2) are placed on the liquid crystal driver substrate 16 with the creams of solder 118 printed, the driver ICs 14 being generally of the flat package type. The flat package ICs are advantageous in that the number of drivers corresponding to dots is larger the higher the printing density. The greater the number of dots printed in a single printing operation, the smaller is the overall size of the printing apparatus according to the present invention. With the ICs 14 mounted on the substrate 16 as illustrated in FIG. 10(c), the substrate 16, solder creams 118, and leads of the ICs 14 are placed one on the other in the order named in regions where the ICs 14 are to be soldered to the substrate 16.

Figure 10E:
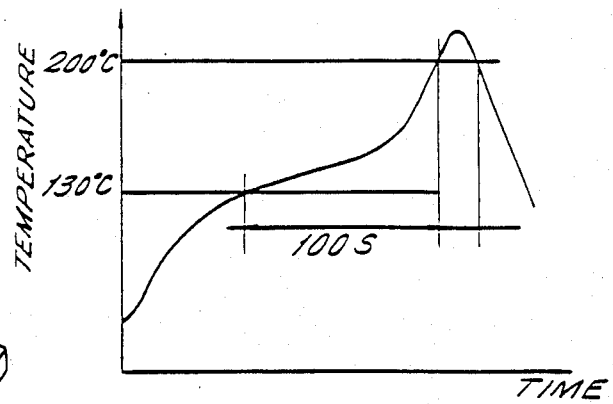
Figure 10D:
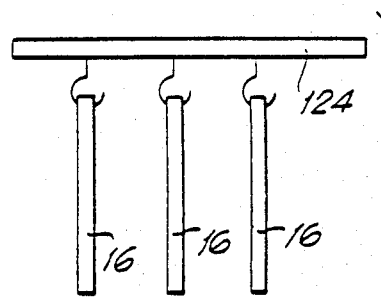
Figure 10D:
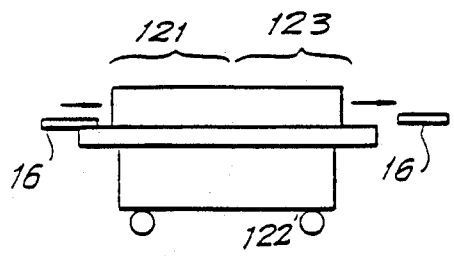

As illustrated in FIG. 10(d), the substrate 16 on which the ICs 14 are mounted, is placed into a far-infrared furnace 122 having a preheater 121 and a far-infrared heater 123. FIG. 10(e) shows a temperature distribution by the far-infrared furnace 122. The substrate 16 passes through the preheater 121 which preheats the substrate 16 to a temperature ranging from 130° C. to 200° C., and then the substrate 16 is heated by the far-infrared heater 123 which irradiates the substrate 16 with far-infrared radiation to melt the solder in the solder cream 118 at a high temperature of more than 200° C. for thereby soldering the ICs 14 to the substrate 16.

By thus printing the solder creams 118 on the substrate 16 and then soldering the flat package ICs 14 to the substrate 16 in a far-infrared furnace 122, the ICs 14 can be soldered to the substrate 16 in a much smaller number of steps than an ordinary soldering process using a soldering iron. The greater the quantity of flat package ICs 14 placed on the substrate 16, the more advantageous is the soldering process in accordance with the present invention as compared with the normal soldering procedure using the soldering iron.

Figure 10F:
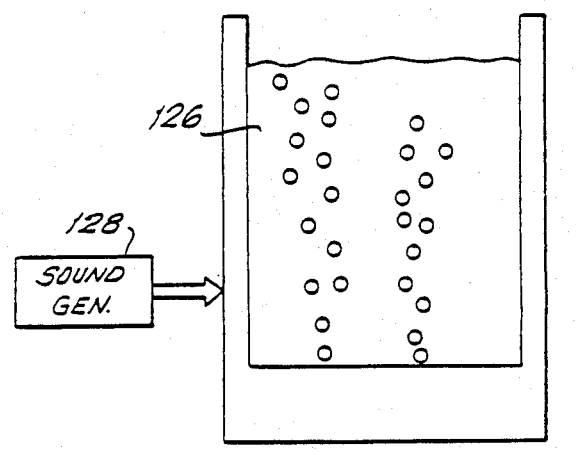

FIG. 10(f) is illustrative of the manner in which the substrates 16 to which the ICs 14 are soldered are cleaned. The substrates 16 are hung by a hanger 124 and dipped into a cleaning solution 126 containing Freon or an alcohol such as Dichlone, or isopropyl alcohol. The cleaning solution 126 is imparted with ultrasonic energy by an ultrasonic generator 128. The substrates 16 can be more thoroughly cleaned in a shorter period of time by the ultrasonic energy. Since the liquid crystal in the printing apparatus according to the present invention is driven at both low and high frequencies, it would tend to cause current leakage between leads and in the power supply if there is a small amount of dirt attached to the liquid crystal driver. The cleaning process, however, completely removes any dirt to increase the reliability of the liquid crystal.

Figure 10G:
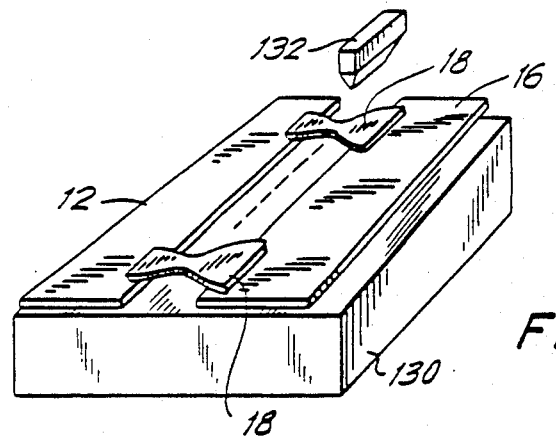

FIG. 10(g) shows the way in which flexible substrates 18 are soldered to the liquid crystal driver mount substrate 16 to electrically connect the latter to the liquid crystal panel 12. The flexible substrates 18 are divided and severed for a suitable number of connector wires and placed on a guide plate 130. Then, the driver substrate 16 and the flexible substrates 18 are positioned by the guide plate 130 for 1 to 1 correspondence between their junctions. A thermal presser 132 which is appropriately heated for enabling soldering is pressed against the junctions between the driver substrate 16 and the flexible substrates 18 to solder them. These junctions should preferably be plated with solder in advance for easy soldering thereof. The flexible substrates 18 are preferably of a length of a few centimeters where length is measured perpendicular to the plane of the paper of FIG. 2(a). If they are too short, then the flexible substrates 18 would be too many. If too long, then the flexible substrates 18 would not have small dimensional tolerances resulting in a difficulty in being properly connected to the driver substrate 16.

Figure 10H:
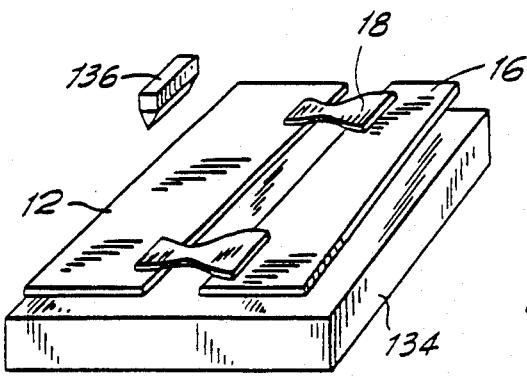

The liquid crystal panel 12 and the driver substrate 16 are soldered together as shown in FIG. 10(h). The liquid crystal panel 12 and the other driver substrate 16 to which the flexible substrate 18 is already soldered are guided on a guide plate 134 so that the junctions of the flexible substrate 18 to the liquid crystal panel 12 are positioned in 1 to 1 correspondence to the terminals of the liquid crystal panel 12. These junctions are thermally pressed by a thermal presser 136 which is appropriately heated to solder the flexible substrate 18 to the liquid crystal panel 12. The junctions of the flexible substrate 18 should be plated with solder, and the terminals of the liquid crystal panel 12 should be composed of transparent electrode terminals plated with metal such as Ni and coated with a layer of solder, or coated directly with a layer of solder. With such an arrangement, the junctions and terminals can easily be soldered with the same soldering material by the thermal presser 136. The metal layer as of Ni on the transparent electrode terminals can be coated with a layer of solder by plating with solder, printing of solder creams, or applying drops of heated and melted solder to the metal layer.

In the foregoing process, the liquid crystal panel 12 and the driver substrate 16 are soldered to each other through the flexible substrate 18 for electrical and mechanical connection. Thereafter, the connected assembly is ultrasonically cleaned in a cleaning solution as of Freon to remove flux and other dirt in a process similar to that shown in FIG. 10(f).

Then, the driver substrate 16, the flexible substrate 18 and the liquid crystal panel 12 which are assembled together are dipped in a tank filled with silicone, epoxy and the like to coat the assembly to render the latter moisture-resistant. The coating prevents any dirt from being deposited on the driver substrate 16, thus protecting the assembly against short circuiting and current leakage. Although the liquid crystal panel 12 is driven by the driver 14 at a high frequency at a voltage higher than ordinary desk-top calculators or watches that are driven at a few tens of volts, electric leakage and short circuiting can be prevented by the coating in highly humid atmosphere as during the rainy season, with the result that the assembly is highly reliable in operation. The moisture-resistant coating can be applied only to the driver substrate 16 to advantage. The coating may also be applied as by spraying, brushing or other processes.

Figure 10I:
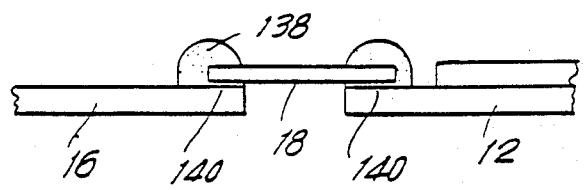

FIG. 10(i) shows the soldered junctions of the driver substrate 16, flexible substrate 18 and liquid crystal panel 12 which are assembled together, the junctions being coated with reinforcing agents 138 which may be composed of epoxy adhesive, urethane adhesive, silicone adhesive or the like. The reinforcing agent 138 covers portions of both the flexible substrate 18 and the driver substrate 16 at the junctions therebetween. The reinforcing agent 138 also covers portions of both of the liquid crystal panel 12 and the flexible substrate 18 at the junctions therebetween. Thus, the reinforcing agents 138 bond the driver substrate 16, the flexible substrate 18 and the liquid crystal panel 12 with increased bonding strength. A certain degree of mechanical strength can be attained by solders 140 of the connections between the flexible substrate 18 and the driver substrate 16 and between the flexible substrate 18 and the liquid crystal panel 12. With the reinforcing agents 138 added, the driver substrate 16, the flexible substrate 18 and the liquid crystal panel 18 are connected with an increased degree of strength. The reinforcing agents 138 also serve to prevent dirt and water from entering the junctions and thus deteriorating the solder, with the result that the driver substrate 16, the flexible substrate 18 and the liquid crystal panel 12 are interconnected with high reliability.

OTHER STRUCTURAL CHARACTERISTICS

The frame 26 of the printing apparatus as shown in FIG. 2 is made of metal such as stainless steel or an aluminum or plastics and serves to unitize the printing apparatus. The frame 26 has vertical and horizontal dimensions ranging from a few tens of centimeters and a width that is substantially equal to the width across which printing can be effected on recording paper. The frame 26 may be smaller in size. The frame 26 doubles as an element for blocking passage of light and for this reason is painted with black. This arrangement prevents the photosensitive drum B (FIG. 1) from being subjected to unwanted exposure. The frame 26 has an air inlet for supplying air to the motor fan from the exterior of the printing system, and an air outlet for discharging air from the motor fan. An air flow caused by the motor fan can properly adjust the temperature of the lamp 36, the liquid crystal panel 12 and other components. Introduction of ambient air allows the temperature to rise in the printing apparatus for preventing the light source from being cooled and also preventing toner from entering the printing apparatus.

The shield plate 38 in FIG. 2 has an opening substantially equal in size to or slightly larger than the light valve portion of the liquid crystal panel 12 to permit light emitted from the lamp 36 to irradiate the light valves of the liquid crystal panel 12. The shield plate 38 is made of a metal such as iron, stainless steel or aluminum, or plastic, but should preferably be made of a metal as it is less thermally deformable.

The shield plate 38 serves to protect the liquid crystal panel 12 against direct contact with heated air flowing from the lamp 36 and thus against excessive temperature rise of the liquid crystal panel 12, and also serves to prevent the polarizers from being deformed and deteriorated. In addition, the shield plate 38 prevents the drivers 14 from malfunctioning and deteriorating due to an excessive temperature rise thereof.

Figure 11:
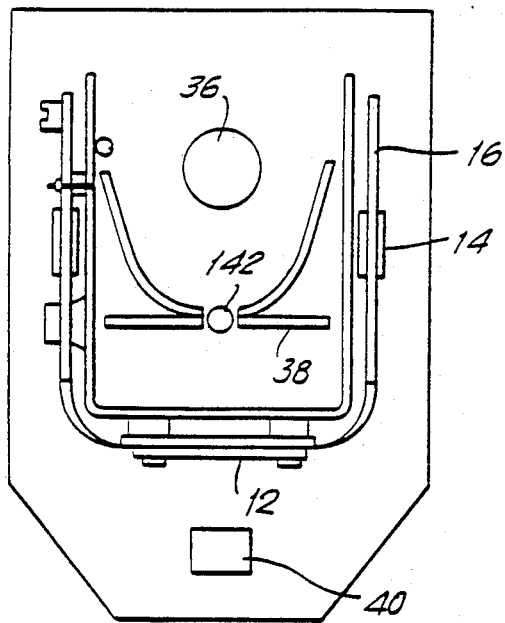
FIG. 11 is a view similar to FIG. 2(a) of an alternative embodiment of a printing apparatus in accordance with the invention.

FIG. 11 shows an alternative embodiment of a printing apparatus in accordance with the invention. The printing apparatus of FIG. 11 is different from the printing apparatus of FIG. 2 in that a rod lens 142 is added to the apparatus. The other components are entirely the same as those shown in FIG. 2, are denoted by the same reference characters, and will not be described again.

Figure 12A:
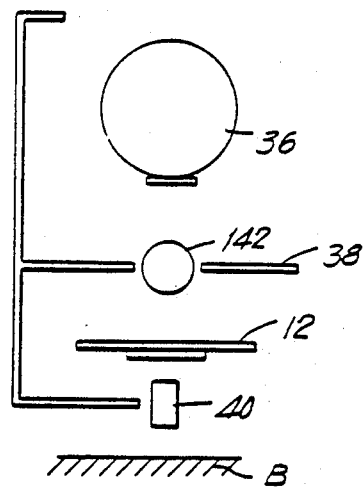
FIG. 12(a) is a portion of FIG. 11 to an enlarged scale with parts omitted.

FIG. 12(a) schematically illustrates a relationship between optical axes of components where the rod lens 142 in the printing apparatus of FIG. 11 is employed. As shown in FIG. 12(a), the lamp 36, the rod lens 142, the liquid crystal panel 12 and the SELFOC lens array 40 are arranged with their optical axes aligned. The upper and lower polarizers are disposed upwardly and downwardly of the liquid crystal panel 12. Light radiated from the lamp 36 is focused by the rod lens 142 onto the light valves of the liquid crystal panel 12, and only the necessary beam of light is transmitted through the light valves and focused by the SELFOC lens array 40 onto the surface of the photosensitive drum B.

Figure 12B:
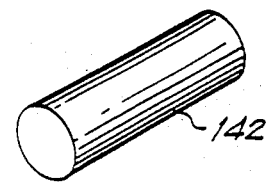
FIG. 12(b) is a perspective view of a rod lens as used in the printing apparatus of FIG. 11.

FIG. 12(b) shows the rod lens 142. As shown, the rod lens 142 is in the shape of a cylindrical rod and made of glass or plastic resin such as acrylic resin or styrene resin.

When the rod lens 142 is used, the wall of the tube of the fluorescent lamp is maintained at a few tens of degrees Celsius, for example, to eliminate the problems of burning-out or deterioration of the polarizers and deterioration of the liquid crystal panel 12 which would otherwise take place if it were not for the rod lens 142.

The rod lens 142 is also advantageous in that the liquid crystal panel 12 is kept under temperature control by the heater 42 (FIG. 2) attached to the liquid crystal panel 12. Temperature control would be lost if the liquid crystal panel 12 were adversely affected by a temperature rise of the tube wall of the lamp 36, and the rod lens 142 prevents the panel 12 from having different temperatures on its upper and lower sides.

Figure 13:
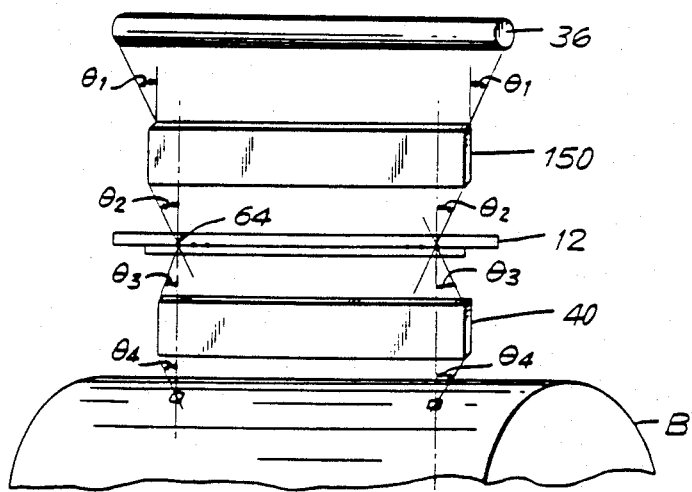
FIG. 13 is a schematic representation of an embodiment of the invention in which a light guide plate is substituted for the rod lens of FIG. 12.

FIG. 13 shows the relationship between the lengths of an elongate light source 36 (FIGS. 1 and 2), a light concentrating device 150, a self-focusing lens 40 of the invention, and the surface B of a photosensitive drum. In this figure, light source 36, which can be a fluorescent lamp, is longer than concentrating device 150. Concentrating device 150, which is a plate-like light guide, is, in turn, longer than the light valve array in liquid crystal panel 12. Like the rod lens of FIGS. 11 and 12, light-guide plate 150 may be made of glass or plastic. While the rod lens is an efficient concentrator of light and serves effectively to shield the microshutter array from the heat produced by light source 36, the focused light is concentrated in a narrow line, resulting in a large variation of light intensity across the width of the light value. To obtain good light distribution, the rod lens must, therefore be made expensively large and requires that close mechanical tolerances be observed.

It has been found, however, that a light guide plate is effective in collecting light from the source while providing uniform illumination of the array, even though the light transmittance is less than that of a rod lens ($\leq 10\%$). The light guide plate is thin, rather than bulky, and the simple shape of a flat rectangular plate 150 with opposed narrow edge surfaces facing the light source and the liquid crystal panel as shown in FIG. 13 can be manufactured accurately at low cost. Further, the sensitivity to placement is less; the mechanical tolerances of the light guide plate system can be double those of a rod lens system.

In FIG. 13: $\theta_1$ is the angle between a perpendicular line extending from one end of concentrating device 150 to light source 36 and a line connecting the end of the concentrating device to the nearest end of the light source; $\theta_2$ is the angle between a perpendicular line extending from the outer edge of the last light valve 64 in the array, at one end of crystal panel 12, to concentrating device 150 and a line connecting the same point on light valve 64 to the end of concentrating device 150; $\theta_3$ is the angle between a perpendicular line extending from the last light valve 64 to self-focusing lens array 40 and a line connecting the same light valve to the nearest end of the self-focusing lens array; and, finally, $\theta_4$ is the angle between a perpendicular line connecting the point of formation of the last dot on photosensitive surface B to the lens array and another line connecting the same dot to the end of lens array 40. When the related spacings are equal, $\theta_3$ and $\theta_4$ are equal.

When angle of light received by and emitted from a single self-focusing lens, $\theta_3$ is not less than the angle $\theta_0$ between self-focusing lens array 40 and light valve 64, the amount of light transmitted by the edge of a last light valve 64 in the array is substantially the same as that which passes through a light valve 64 in the center of the array. Uniform transmission of light is thus provided by the entire length of the self-focusing lens array 40 used in the printing apparatus of the present invention. Also, when angle of light received by and emitted from a single self-focusing lens, $\theta_2$ is not less than the angle $\theta_0$ between self-focusing lens 40 array and light valve 64, the self-focusing lens array passes slight uniformly without deviation in the end region. Finally, when angle of light received by and emitted from a single self-focusing lens, $\theta_1$ is not less than the angle $\theta_0$ between self-focusing lens array 40 and of a light valve 64, a uniform amount of light is received and transmitted by self-focusing lens array 40.

PRINTING

Printing operation of the printing apparatus is now briefly described. An example is described in which two rows of light valves are spaced 250 microns apart from each other in the printing apparatus driven at a ½ duty cycle with a period $T_1$ being 2 ms. The photosensitive drum was rotated to advance a distance of 100 microns per period of 2 ms. A width of 5 cm (100 microns $\times$ (1,000 ms/2 ms) = 50,000 microns) was printed per second.

Advantages of the printing system using the printing apparatus of the invention are now discussed. The printing system using the printing apparatus in accordance with the present invention has a paper traveling system which is essentially composed of a photosensitive system, a developing system and a fixing system, and does not produce noise which would be generated by impact printers and the like. The printing system is inexpensive as it employs no high-speed precision optical scanning system such as would be incorporated in laser printers. Latent images can be formed by turning the light valves on and off. Thus, the printing system is driven by a lower voltage than the voltage required by the laser printers. The printing system utilizes light which is safe as it is of a lower energy intensity than that of laser beams.

The printing apparatus in accordance with the present invention can be implemented by replacing the optical writing unit in conventional expensive laser printing systems, printing systems using OFF, and multi-stylus charge printing system, with conventional developing, fixing, discharging, and charging units that are technically stable and inexpensive, being usable as they are presently developed. Since the self-focusing lens array is used for writing, the printing apparatus and hence the printing system as a whole can be small in size and lightweight, and printed records suffer from no distortions and deformations. Furthermore, the interface used is comprised of simple liquid crystals drivable by drive signals for writing, and thus these components can be controlled with ease and manufactured with less cost. The accuracy of printing can be changed as desired by varying the pitch and size of patterns of liquid crystal light valves. The patterns of the liquid crystal light valves can be fabricated with dimensions defined on the order of microns, so that the printing apparatus of the invention can print with a much higher resolution as compared with conventional printing apparatus. The printing apparatus of the invention employs a liquid crystal panel having a response time expressed in figures about two digits faster than the response time of the prior art liquid crystals, resulting in an ability to print at a much higher speed. The liquid crystal values are arranged in a single row or a few rows. The single row or few rows can be opened or closed at timing for high-speed printing operation.

As described above, the printing apparatus according to the present invention can utilize processes and components for developing, fixing, discharging, and charging of prior printing apparatuses. Inexpensive and high-speed printing systems can be reduced to practice simply by replacing the printing units in such conventional printing apparatuses with printing units in accordance with the present invention.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A liquid crystal optical printing apparatus comprising:

a light source in the form of a fluorescent lamp;

a liquid crystal panel subject to being irradiated with light from the source, the liquid crystal panel comprising a plurality of light valves arranged in a linear array;

a light guide plate positioned between the light source and the liquid crystal panel for directing light from the light source onto the array of light valves, the light guide plate being disposed substantially parallel to the linear array of the light valves and in line of travel of light from the light source through the light valves with opposed narrow edge surfaces facing the light source and the liquid crystal panel;

driver means for selectively opening and closing the light valves;

means for receiving images of the light valves for reproduction; and lens means comprising a plurality of self-focusing fiber lenses for focusing incident light from the liquid crystal panel on the means for receiving images, each lens producing an image of at least one light valve on the receiving means.

2. The liquid crystal optical printing apparatus of claim 1 wherein the light source, light guide plate, liquid crystal panel, and lens means are optically aligned.

3. The liquid crystal optical printing apparatus of claim 1 wherein the linear array of the liquid crystal panel comprises plurality of light valves arranged in a plurality of rows and the self-focusing fiber lenses are arranged in an approximately like number of parallel thereto.

4. A liquid crystal optical printing apparatus of claim 3 wherein the fields of the self-focusing fiber lenses overlap.

5. The liquid crystal optical printing apparatus of claim 4 wherein the degree M of overlap of adjacent fields, defined as the ratio of the visual field $X_0$ to the distance D between centers of the lenses, is above 1.3.

6. The liquid crystal optical printing apparatus of claim 3 wherein there are two rows of light valves in the linear array and at least two rows of fiber lenses arranged parallel thereto.

7. The liquid crystal optical printing apparatus of claim 6 wherein the fields of the self-focusing fiber lenses overlap.

8. The liquid crystal optical printing apparatus of claim 7 wherein the degree M of overlap of adjacent fields, defined as the ratio of the visual field $X_0$ to the distance D between centers of the lenses, is above 1.3.

9. The liquid crystal optical printing apparatus of claim 6 wherein the sum of the width L of a light valve and the distance $L_2$ between a line joining the centers of the light valves in one row and another line joining the centers of the light valves in the sescond row is less than or equal to the distance D between centers of adjacent self focusing fiber lenses.

10. The liquid crystal optical printing apparatus of claim 1 wherein the angle $\theta_3$ between a line drawn perpendicular to the self-focusing fiber lens array and passing through the center of an endmost light valve in the liquid crystal panel and a line passing from the end of the self-focusing fiber lens array through the same light valve is not less than the angle of light received by and emitted from a self-focusing fiber lens of the self-focusing fiber lens array.

11. The liquid crystal optical printing apparatus of claim 1 wherein the angel $\theta_2$ between a perpendicular line extending from the endmost light valve in the liquid crystal panel to the light guide plate and a line extending from the same light valve to the nearest end of the light guide plate is not less than the angle of light received by and emitted from a self-focusing fiber lens of the self-focusing fiber lens array.

12. The liquid crystal optical printing apparatus of claim 1 wherein the angle $\theta_1$ between a perpendicular line extending from one end of the light guide plate to the light source and a line connecting the end of the light guide plate to the nearest end of the light source is not less than the angle of light received by and emitted from a self-focusing fiber lens of the self-focusing fiber lens array.

13. The liquid crystal optical printing apparatus of claim 1 wherein the angle $\theta_3$ between a line drawn perpendicular to the self-focusing fiber lens array and passing through the center of an endmost light valve in the liquid crystal panel and a line passing from the end of the self-focusing fiber lens array through the same light valve is not less than the angle of light received by and emitted from a self-focusing fiber lens of the self-focusing fiber lens array, the angle $\theta_2$ between a perpendicular line extending from the endmost light valve in the liquid crystal panel to the light guide plate and a line extending from the same light valve to the nearest end of the light guide plate is not less than the angle of light received by and emitted from a self-focusing fiber lens of the array, and the angle $\theta_1$ between a perpendicular line extending from one end of the light guide plate to the light source and a line connecting the end of the light guide plate to the nearest end of the light source is not less than the angle of light received by and emitted from a self-focusing fiber lens of the array.

14. The liquid crystal optical printing apparatus of claim 1 wherein the light guide plate is made of one of the group of glass and plastic.

15. The liquid crystal optical printing apparatus of claim 1 and further comprising:
shield means interposed between the light source and the liquid crystal panel, the shield means cooperating with the light guide plate to prevent heating of the liquid crystal panel by light from the light source.

* * * * *